United States Patent [19]

Erickson et al.

[11] Patent Number: 5,104,921

[45] Date of Patent: Apr. 14, 1992

[54] RADIATION CURED POLYMER COMPOSITION

[75] Inventors: James R. Erickson, Katy; Earle E. Ewins, Jr., Houston, Tex.

[73] Assignee: Shell Oil Company, Houston, Tex.

[21] Appl. No.: 420,716

[22] Filed: Oct. 12, 1989

Related U.S. Application Data

[63] Continuation of Ser. No. 157,347, Feb. 17, 1988, abandoned.

[51] Int. Cl.$^5$ ............................. C08J 3/28; C08K 5/01; C08L 53/02

[52] U.S. Cl. ........................ 524/274; 522/80; 522/110; 522/125; 524/312; 524/313; 524/476; 524/478; 524/483; 524/484; 524/486; 524/487; 524/488; 524/489; 524/505; 524/534; 525/97; 525/98

[58] Field of Search .............. 522/110, 125, 80; 524/274, 312-313, 476, 478, 483, 484, 486, 487, 488, 489, 505, 534; 525/97, 98

[56] References Cited

U.S. PATENT DOCUMENTS

| Re. 28,246 | 11/1974 | Stockford | 62/298 |
|---|---|---|---|
| 2,956,904 | 10/1960 | Hendricks | 117/93 |
| 3,078,254 | 2/1963 | Zelinski et al. | 260/45.5 |
| 3,113,912 | 12/1963 | Kraus et al. | 204/154 |
| 3,135,716 | 6/1964 | Uraneck et al. | 260/45.5 |
| 3,224,664 | 4/1966 | Zelinski | 260/41.5 |
| 3,239,478 | 3/1966 | Harlan | 260/27 |
| 3,251,905 | 5/1966 | Zelinski | 260/879 |
| 3,265,765 | 8/1966 | Holden et al. | 260/876 |
| 3,390,207 | 6/1968 | Moss et al. | 260/879 |
| 3,427,269 | 2/1969 | Davis et al. | 260/27 |
| 3,468,972 | 9/1969 | Hsieh | 260/836 |
| 3,594,452 | 7/1971 | De La Mare et al. | 260/880 |
| 3,595,941 | 7/1971 | Farrar et al. | 260/879 |
| 3,598,887 | 8/1971 | Darcy et al. | 260/879 |
| 3,625,752 | 12/1971 | Korpman | 117/122 P |
| 3,639,521 | 2/1972 | Hsieh | 260/880 |
| 3,917,607 | 11/1975 | Crossland et al. | 260/28.5 |
| 3,932,328 | 1/1976 | Korpman | 260/27 |
| 3,984,509 | 10/1976 | Hall et al. | 264/40.1 |
| 3,985,830 | 10/1976 | Fetters et al. | 260/880 B |
| 4,010,226 | 3/1977 | Crossland et al. | 260/880 B |
| 4,130,606 | 12/1978 | Van Ballegooijen | 525/237 |
| 4,133,731 | 1/1979 | Hansen et al. | 522/110 |
| 4,151,057 | 4/1979 | St. Clair | 522/110 |
| 4,152,231 | 5/1979 | St. Clair | 522/112 |
| 4,163,077 | 7/1979 | Antonsen et al. | 428/355 |
| 4,208,356 | 6/1980 | Fukawa et al. | 525/89 |
| 4,219,627 | 8/1980 | Halasa et al. | 525/89 |
| 4,391,949 | 8/1981 | St. Clair | 525/99 |
| 4,430,417 | 2/1984 | Heinz et al. | 430/286 |
| 4,432,848 | 2/1984 | Korpman | 204/159.17 |
| 4,444,953 | 4/1984 | St. Clair | 525/98 |
| 4,483,951 | 11/1984 | Brenner | 524/82 |
| 4,948,825 | 8/1990 | Sasaki | 524/274 |

FOREIGN PATENT DOCUMENTS

| 716645 | 8/1965 | Canada . | |
| WO88/09800 | 12/1988 | PCT Int'l Appl. . | |
| 809838 | 3/1959 | United Kingdom | 522/125 |

OTHER PUBLICATIONS

"Charlesby's Atomic Radiation and Polymers", Permagan Press Ltd., 1960, pp. 258–296.

"Experimental Thermoplastic Rubbers for Enhanced Radiation Crosslinking of Hot Melt PSA's", by J. R. Erickson, presented at 1985 TAPPI Hot Melt Symposium, May 1985.

(List continued on next page.)

*Primary Examiner*—Marion E. McCamish
*Assistant Examiner*—Arthur H. Koeckert

[57] ABSTRACT

A cured composition possessing excellent cohesive strength at high temperatures along with excellent adhesion, shear strength and solvent resistance is prepared by the high energy ionizing radiation initiated curing of a polymer composition comprising an alkenyl arene/-conjugated diene block copolymer and a oligomer such that the unsaturation index of the composition is minimized. The radiation initiated curing of the adhesive composition is accomplished without requiring the aid of a coupling agent to promote crosslinking of the block copolymer during exposure to the radiation.

22 Claims, 6 Drawing Sheets

OTHER PUBLICATIONS

Abstracts of Japanese Patent Document J51026941 of Mar. 5, 1976.

Abstract of Japanese Patent Document J52078239 of Jan. 7, 1977.

Abstract of Japanese Patent Document J5902458 of Nov. 16, 1984, Jan. 1985.

Abstract of Japanese Patent Document J59210958 of Nov. 29, 1984, Jan. 1985.

"Radiation Curing of Pressure Sensitive Adhesives Based on Thermoplastic Rubbers", by D. J. St. Clair, presented at 1979 TAPPI Hot Melt Adhesive Short Course, Hilton Head, S.C.

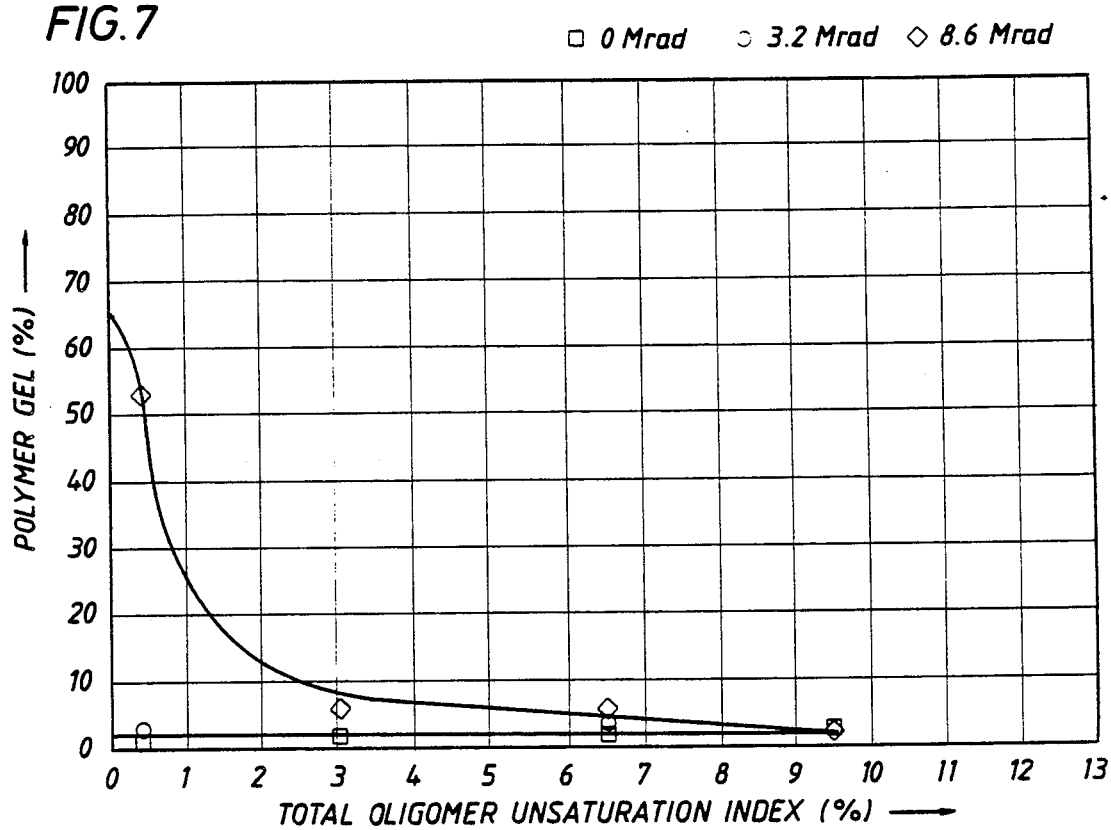
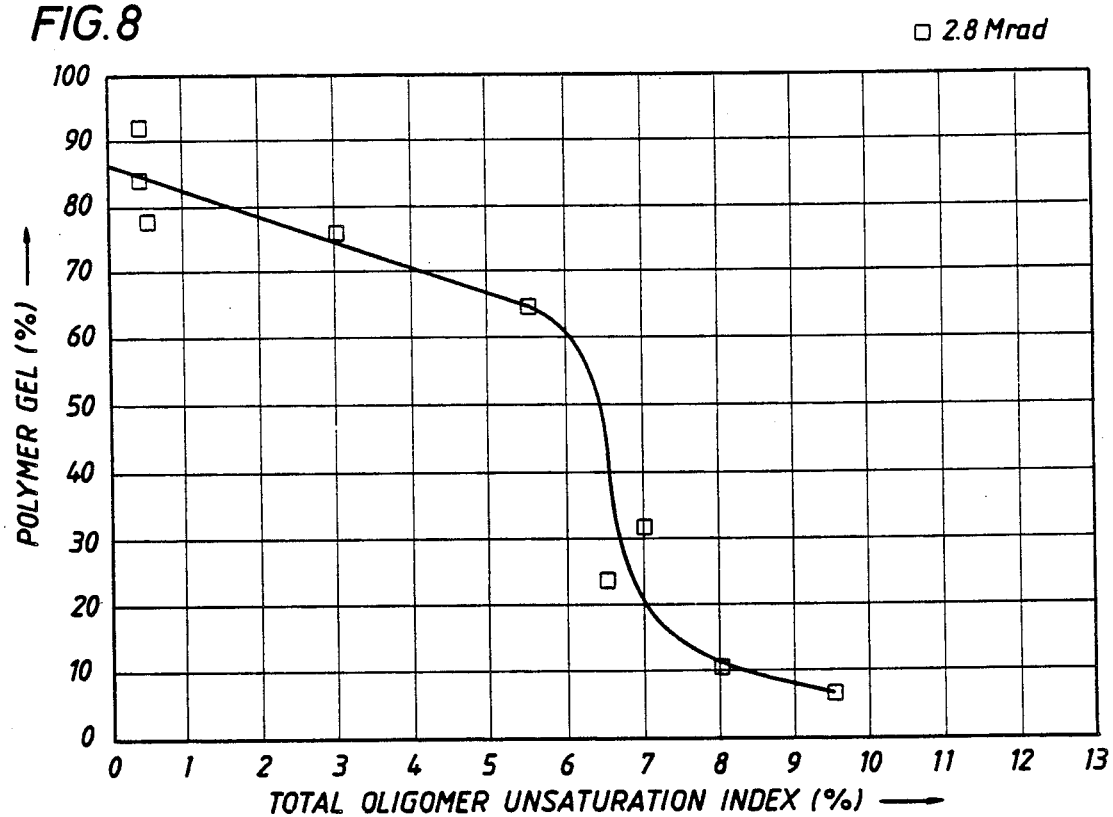

RADIATION CURED POLYMER COMPOSITION

This is a continuation of application Ser. No. 157,347, filed Feb. 17, 1988, now abandoned.

CROSS REFERENCE TO COPENDING APPLICATION

The present invention is related to the invention disclosed in the copending patent application, Ser. No. 157,354, filed on Feb. 17, 1988 now abandoned, entitled Radiation Cured Polydiene Based Polymer Composition, and having the same assignee.

FIELD OF THE INVENTION

The present invention relates to adhesive compositions, and more particularly, to adhesive compositions cured by subjection to ionizing radiation without requiring the aid of coupling agents which promote crosslinking of the elastomeric block copolymer therein during exposure to the radiation.

BACKGROUND OF THE INVENTION

Alkenyl arene/conjugated diene block copolymers have been formulated in the past to produce a number of types of adhesive compositions. These block copolymers are thermoplastic in nature. At room temperature, such block copolymers are typically rubbery materials due to the alkenyl arene blocks being microscopically phase separated and physically cross-linking both phases (arene phase and diene phase) of these block copolymers. The most common of these are anionically polymerized polystyrene-polyisoprene-polystyrene (SIS) and polystyrene-polybutadiene-polystyrene (SBS) block copolymers. Thermoplastic rubbers such as these are extensively used in pressure sensitive adhesives (PSA's) for tapes and labels. In addition to exhibiting a good balance of adhesive properties, such adhesives have attractive processing characteristics. They are highly suited for either solvent coating or hot melt coating. The basic patent in this field, Harlan, U.S. Pat. No. 3,239,478, shows combinations of these block copolymers with solid, unsaturated tackifying resins and paraffinic extending oils to produce a wide spectrum of adhesives.

In the solvent coating process, a solvent dissolves both phases of the block copolymer, and a relatively low viscosity solution results, allowing the adhesive to be applied at moderately high solids content. In this system, the solids content of the adhesive formulation is much higher than those of conventional natural rubber based adhesives due to the lower molecular weight of these styrenic block copolymers. After the adhesive is coated onto a web and the solvent evaporated, the physical crosslinking produced by the formation of polystyrene domains is restored. However, these solvent-based processes posses inherent disadvantages, primarily due to the addition and evaporation of the solvent itself. The addition of solvent requires storage and handling equipment, plus the cost of the solvent itself. The evaporation of the solvent involves substantial investment and costs in the procuring and the operation of drying ovens, air pollution equipment, and fire and safety equipment.

In response, solvent-free hot melt adhesive formulations and processes were introduced. Styrenic block copolymers were especially suited for use in such adhesives as a direct result of their polystyrene domain structure. For example, Korpman, U.S. Pat. No. 3,932,328, discloses an SIS block copolymer in combination with a blend of unsaturated solid and liquid tackifying resins in specific proportions producing a solvent-free and substantially oil-free adhesive composition.

In the hot melt process, the adhesive is melted and applied at temperatures well above the glass transition temperature of the polystyrene domains (phase) of the styrenic block copolymer. As a result of relatively low molecular weight of the block copolymer, the adhesive readily flows. After application and cooling, the glassy polystyrene domains are restored and provide the physical crosslinking that allows the adhesives to exhibit a good balance of service properties.

Based on the foregoing, two limitations of these adhesive compositions become readily apparent which are a direct result of the structure of the styrenic block copolymers therein. The limitations are the poor solvent resistance and relatively low service temperatures of these adhesives. Although these adhesives can withstand very short contact with common solvents, prolonged contact with aromatic solvents or blends containing aromatic, ester or ketone solvents and low molecular weight plasticizers will cause these adhesives to soften and lose adhesive strength. Furthermore, the highest temperature at which these styrenic block copolymers retain useful properties and act like a vulcanized rubber is essentially limited by the glass transition temperature (Tg) of the polystyrene domains. Depending upon the molecular weight of the polystyrene blocks and the load, these block copolymers can begin to significantly creep or flow at 40° C. to 70° C. For a number of applications, it would be very advantageous to have higher service temperatures. For example, these adhesives would be useful in paint shops if the masking tapes produced had solvent resistance at a 70° C. to 120° C. service temperature. They would be useful as laminating adhesives in, for example, retortable food pouches if they could withstand boiling water temperatures and in furniture laminating adhesives if they could bear moderate loads at 120° C.

One means to improve the solvent resistance and service temperature of these styrenic block copolymer adhesive compositions is to augment the existing physical crosslink network with a covalently bonded crosslink network. High temperature or solvent resistant PSA products applied by the solvent coating process are generally covalently crosslinked by phenolic resins included in a natural rubber based adhesive. The crosslinking reaction is initiated thermally by heating the tape onto which the PSA has been coated in a curing oven section at the end of the solvent evaporation drying ovens of the solvent coater. This same technology has been used to crosslink solvent coated PSA based on thermoplastic rubbers as disclosed in Korpman, U.S. Pat. No. 3,625,752. Therein, the adhesive is chemically cured (covalently crosslinked) with a phenol formaldehyde resin and heat. However, this procedure is undesirable not only because of the disadvantages previously enumerated and associated with solvent-based adhesive processes, but additionally the cost associated with curing the adhesive which is also a very energy intensive process. Furthermore, measures must be taken to safeguard against prematurely triggering the thermally-initiated curing in the coating equipment before the adhesive is applied to the tape or label substrate. Also, this process cannot be used on heat sensitive substrates such as plastics because the substrates melt at the temperatures required to cure the adhesive.

A more energy efficient process is to use ionizing radiation to cure the adhesive. Radiation curing of solvent applied simple diene rubber-resin pressure sensitive adhesives was first disclosed by Hendricks, U.S. Pat. No. 2,956,904. Therein, Hendricks showed that the adhesives cured at about 1 to 3 Mrad had at least doubled the cohesive strength the adhesives had before irradiation, and yet did not decrease in tack. Increased cohesive strength was measured by improved holding power at 120° F. (about 50° C.).

Kraus et al., U.S. Pat. No. 3,113,912, disclosed that vinyl-substituted aromatic hydrocarbon/butadiene or isoprene block copolymers may be crosslinked by subjecting same to ionizing radiation so as to produce clear, colorless vulcanizates which have high tensile strengths. The total dosage of irradiation disclosed ranged from about 2 to 50 Mrep, preferably not exceeding 30 Mrep (where 1 Mrep is approximately 1 Mrad). The dosages utilized in the examples therein were 10, 30 and 70 Mreps, with 10 Mreps being preferred. Kraus et al., also noted the superiority of an irradiated block copolymer over a similarly irradiated random copolymer analog and likewise the superiority of an irradiated triblock copolymer over an irradiated diblock copolymer.

Hansen et al., U.S. Pat. No. 4,133,731, and Korpman, U.S. Pat. No. 4,432,828, pointed out that the improvements of Hendricks were insufficient and much higher doses of irradiation would be required to provide the higher temperature resistance needed commercially. Additionally, the composition of Kraus et al., lacks the tack required by adhesives, sealants, coatings and the like. Furthermore, the dosages actually utilized by Kraus et al. are much too high to be commercially acceptable in the above-referenced applications.

Hansen et al. and Korpman disclosed adhesives containing an alkenyl arene/conjugated diene block copolymer, a tackifying resin (preferably unsaturated) and a radiation sensitive coupling agent. In these adhesives, the radiation sensitive coupling agent contained therein is a particularly essential component. Both Hansen et al. and Korpman disclosed that the irradiation dosage required varies inversely with the amount of the coupling agent employed. Thus, the more coupling agent utilized, the lower the irradiation dose required. Collectively, Hansen et al., and Korpman disclosed how adhesives with greater cohesive strength and good tack may be produced by curing at irradiation dosages from about 2 to 5 Mrad.

The coupling agents specified therein are di-, tri- and/or tetra-functional acrylates or methacrylates selected from the group consisting of acrylic and methacrylic acid esters of polyols, with the multifunctional acrylates being the more effective of the two types. However, by adding a facile crosslinking monomer to the adhesive, several new problems surfaced. The compositions were now more costly and contained an ingredient (crosslinking monomer) that is an irritant at best and toxic at worse. Furthermore, the adhesives although tacky, did experience a decrease in tack as a result of either increasing the irradiation dosage at a given crosslinking monomer concentration or increasing the crosslinking monomer concentration at a given dose of irradiation. This decrease in tack is attributed to increasing the crosslinking density.

Hansen et al. also noted that as the number of arms in the block copolymer is increased, for example linear versus radial versus star polymers, the adhesive may be more readily crosslinked at a particular crosslinking monomer concentration. In such star polymers, the number of crosslinks per molecule would be high enough to give very good solvent resistance and high temperature cohesive strength and yet the crosslink density would be low enough to maintain the tack properties. Interestingly, Hansen et al. appear to also suggest that an adhesive containing a star block copolymer having many arms (i.e., $>8$ arms) may be sufficiently radiation responsive to forego the use of the crosslinking monomer. See FIG. 4 therein.

Multiarm SIS block copolymers which are radiation responsive have recently been reported on two occasions by J. R. Erickson in "Experimental Thermoplastic Rubbers for Enhanced Radiation Crosslinking of Hot Melt PSA's" presented at TAPPI 1985 Hot Melt Symposium, May 1985, and in "EB Curable Rubber Has More Heat and Solvent Resistance", *Adhesive Age*, Vol. 29(4), p. 22 (April 1986). The first article discloses adhesives formulated from either of two experimental multiarm SIS block copolymers and an unsaturated solid tackifying resin. The article compares these adhesives with and without coupling agents. The second article is a continuation of the work reported in the first and discloses a third multiarm SIS block copolymer which is also radiation responsive. This multiarm SIS block copolymer is also formulated with an unsaturated tackifying resin, specifically a blend of a solid and a liquid unsaturated tackifying resin. However, there is still a need to further reduce the required irradiation dosage to lower levels while simultaneously eliminating the incorporation of a radiation responsive coupling agent. This is motivated in part to reduce operating and equipment costs. Furthermore, in particular applications, the adhesive substrate may degrade or be adversely affected when exposed to certain levels of irradiation.

A new adhesive composition that can be easily cured at lower and economical dosages of irradiation without requiring the aid of a coupling agent has now been found. Unlike Hendricks, Hansen et al. and Korpman, the exact chemical nature of the oligomers added thereto, such as tackifying resins and oils, is critical. The oligomers in the composition which are compatible with the poly (conjugated diene) portion of the block copolymer must be chosen such that the amount of the unsaturated carbon atoms from these sources is minimized. Furthermore, the molecular weight of the alkenyl arene/conjugated diene block copolymer must also be sufficiently high to allow an effective and economical cure to be achieved.

SUMMARY OF THE INVENTION

It is an object of the present invention to provide a new high energy ionizing radiation curable adhesive composition which is curable at low dosage for lowest cost.

It is another object of the present invention to provide a new radiation curable adhesive composition comprising of an elastomer; an oligomer, such as a tackifying resin, plasticizer, oil and aliphatic wax, such that the unsaturation index of the composition is at most 6%; and, optionally, pigments, filler, thickeners, stabilizers and flow control agents.

It is a further object of the present invention to provide a new high energy ionizing radiation curable adhesive composition containing no solvent thereby eliminating the need to remove the solvent from the composition as part of the curing process.

It is yet another object of the present invention to provide a new high energy ionizing radiation curable adhesive composition which is curable without the aid of a coupling agent which promotes crosslinking of the elastomeric block copolymer during exposure to the radiation.

In accordance with the present invention, an adhesive composition is provided which is capable of being cured by high energy ionizing radiation without the aid of a radiation sensitive coupling agent, particularly at economically attractive dosages. The cured adhesive composition possesses excellent high temperature cohesive strength along with excellent adhesion, shear strength and solvent resistance. The adhesive is prepared by the high energy ionizing radiation, such as electron beam, initiated curing of an adhesive composition comprising:

(a) a branched block copolymer which comprises
 (1) at least two polymer blocks A, each of said blocks A being at least predominantly a polymerized alkenyl arene block, and
 (2) at least one polymer block B, said block B being at least predominantly a polymerized conjugated diene block,
 (3) wherein said at least one block B is between said at least two blocks A, each of said blocks A having a weight average molecular weight of about 3,000 to about 125,000, each of said blocks B having a weight average molecular weight of about 15,000 to about 250,000, said blocks A comprise from about 1 to about 55 percent by weight of said branched block copolymer, and said blocks B having a total weight average molecular weight of at least about 0.3 million, and (b) about 0 to about 2000 parts by weight per 100 parts by weight of said branched block copolymer of at least one oligomer compatible with said blocks B, (c) wherein said composition prior to irradiation having an unsaturation index of at most about 6.0%, said composition unsaturation index being defined by the following expression:

$$\sum_{i}^{t} (w_i)(U_i) = U_T$$

wherein:
"i" represents a particular oligomer in the composition,
"$w_i$" represents the weight fraction of said particular oligomer based on the total weight of components (a) and (b) of said composition,
"$U_i$" represents the unsaturation index of said particular oligomer, as an equivalent percentage of unsaturated carbon atoms therein,
"t" represents the total number of said oligomer in said composition, and
"$U_T$" represents the unsaturation index of said composition.

Such a composition is capable of being cured by exposure to high energy ionizing radiation without the aid of a radiation sensitive coupling agent to promote crosslinking of the branched block copolymer at economically acceptable dosages.

The branched block copolymer may be a graft, radial or star polymer having at least three (3), preferably at least six (6) branches or arms. Additionally, the branched block copolymer may be formed by coupling two or more block copolymers, together, such as coupling two (2) radial block copolymers together. Likewise, other branched block copolymers may be coupled together. Such branched block copolymers possess lower melt and solution viscosities and improved shear stability than their linear counterparts having like molecular weight and alkenyl arene content due to the compact structure of the branched block copolymer. The star block copolymer is a particularly preferred structure. The radial and star block copolymers may be symmetric or asymmetric with respect to the arms radiating from its nucleus.

Furthermore, it is essential to the present invention that the unsaturation index of the oligomers be maintained at a sufficiently low level to allow curing of the composition by exposure to high energy ionizing radiation without the aid of a radiation sensitive coupling agent to promote crosslinking of the branched block copolymer. As the unsaturation index of the oligomers ($U_T$) decreases, the irradiation dosage tends to decrease. Thus, it has been found that when $U_T$ is less than or equal to about 6%, irradiation dosages of may be reduced by at least about 7%, and reductions as high as about 20% have been observed, and produce compositions having excellent adhesive properties. However, to further reduce the irradiation dosages to yield like properties in the compositions herein, $U_T$ is preferably at most about 3% and more preferably at most about 1.5%. As $U_T$ approaches zero, irradiation dosages of about 1 Mrad or possibly less may be adequate to yield such adhesive properties.

Additional components may be present in the composition including, among others, antioxidants, block A compatible resins, pigments, fillers, thickeners, stabilizers and flow control agents. Furthermore, direct and indirect crosslink promoters may be added thereto to further decrease irradiation dosages.

These and other objects, features and advantages of the present invention will become apparent from the subsequent description, examples, and the appended claims taken in conjunction with the accompanying drawings.

IN THE DRAWINGS

FIG. 7 is an x-y plot of Polymer Gel (%) versus Component Unsaturation Index, $U_T$, (%) at various electron beam irradiation dosages.

FIG. 8 is an x-y plot of Polymer Gel (%) versus Component Unsaturation Index, $U_T$, (%) at an electron beam irradiation dose of 2.8 Mrad.

DETAILED DESCRIPTION OF THE INVENTION

A. Block Copolymer

Figure 1:
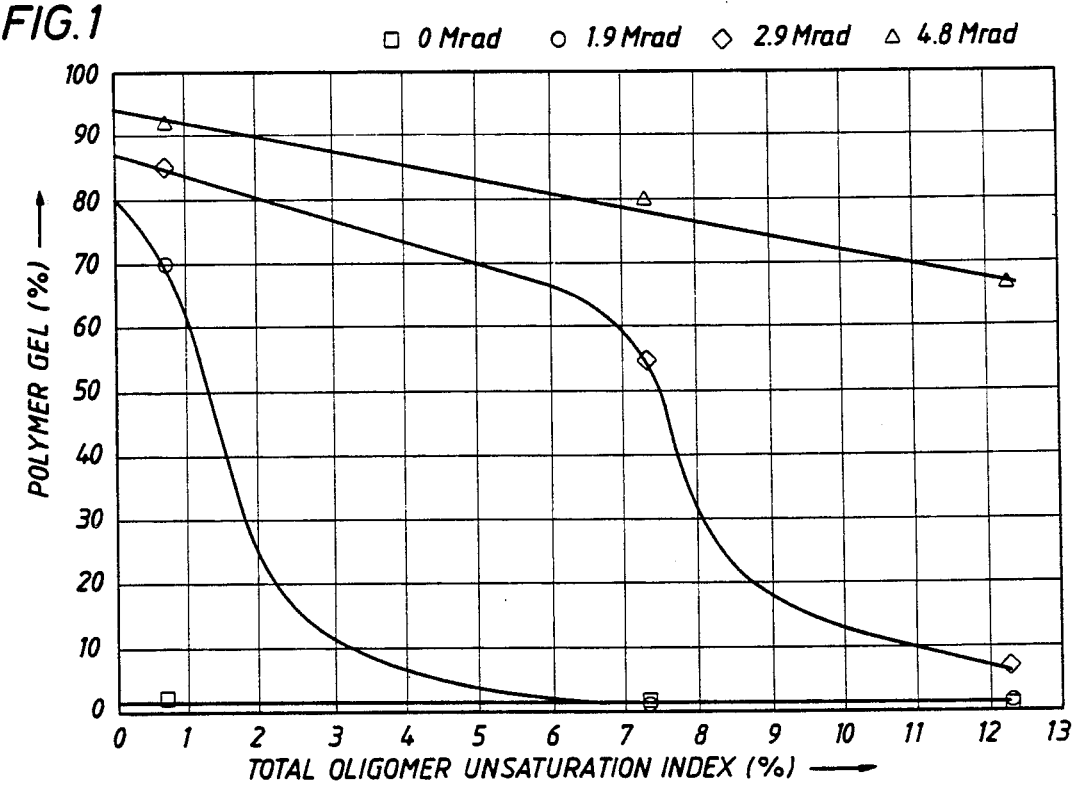
FIG. 1 is an x-y plot of Polymer Gel (%) versus Composition Unsaturation Index, $U_T$, (%) at various electron beam irradiation dosages.

The block copolymers employed in the present composition are preferably thermoplastic elastomers and have at least two alkenyl arene polymer blocks A and at least one elastomeric conjugated diene polymer block B between these at least two blocks A, thereby facilitating physical crosslinking via the alkenyl arene domains. Additionally, the macromolecular configuration of the block copolymer is preferably branched, as opposed to linear. Branched block copolymers include graft, radial or star configurations, depending upon the method by which the block copolymer is formed. It is preferred that the branched block copolymer have at least three (3), preferably at least six (6), branches or arms. In order to satisfy this latter preferred condition, a radial block copolymer having at least three (3) arms may be coupled with at least one other radial block copolymer also having at least three (3) arms. Likewise, other branched block copolymers may be coupled together. The coupling may occur between at least one branch or arm on each of the branch block copolymers to be coupled. With respect to radial and/or star block copolymers, the nucleus of one may be coupled with either an arm or nucleus of another radial or star block copolymer.

Though a linear block copolymer could be utilized herein, there are certain practical drawbacks to doing so which favor the utilization of branched block copolymers, particularly, those branched block copolymers having at least three (3), preferably at least six (6), branches or arms. Due to the compact configuration of the branched block copolymer, the branched block copolymers possess lower melt and solution viscosities than linear block copolymer analogs having a like alkenyl arene content and molecular weight. Furthermore, branched block copolymer, of this type allow one to increase molecular weight with only a modest increase in viscosity. As such in a solvent coating process, these branched block copolymers may be applied at higher solids contents than their linear analogs. Thus, in either case, the branched block copolymers may be processed as easily as a relatively low molecular weight linear polymer. Additionally, in a hot melt process utilizing high shear equipment, the branched block copolymers possess greater shear stability.

Branched block copolymers should also result in better adhesives than their linear analogs. When a linear block copolymer is crosslinked, its modulus will increase and result in a reduction in the tack of the adhesive. However, if for example a star block copolymer having 10 arms is used in the adhesive, it is only required that 2 of the arms of each molecule be crosslinked to other molecules to form a covalently crosslinked network. Since the other 8 arms remain covalently uncrosslinked, the adhesive modulus remains low and the covalently crosslinked adhesive retains tack.

Typical examples (not exhaustive) of various structures of suitable branched block copolymers in the present invention are represented by the following general structural formula for star-type branched block copolymers:

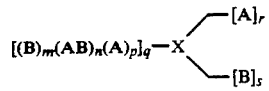

wherein:
A is a polymer block of an alkenyl arene,
B is a polymer block of a conjugated diene,
X is a residual group of a polyfunctional coupling agent having two or more functional groups,
m is an integer equal to 0 or 1,
n is an integer equal to 1 to 10,
p is an integer equal to 0 or 1,
q is an integer equal to 1 to 40,
r is an integer equal to 0 to 20,
s is an integer equal to 0 to 39, and
$3 \leq q+r+s \leq 40$.

Furthermore, the above-mentioned branched configurations may be either symmetrical or asymmetrical with respect to the polymer chains radiating from X. In an asymmetric configuration, the polymer chains may be of different molecular weights and/or different structures.

It will be understood that both blocks A and B may be either homopolymer, random or tapered copolymer blocks as long as each block at least predominates in at least one class of the monomers characterizing the blocks defined hereinbefore. As such, blocks A may comprise copolymers of two or more alkenyl arenes, e.g., styrene/alpha-methylstyrene copolymer blocks, or alkenyl arene/conjugated diene random or tapered copolymer blocks as long as the blocks A individually at least predominate in alkenyl arenes, i.e., greater than 50% by weight. The alkenyl arene content of the individual blocks A is preferably from about 80% to 100% by weight, more preferably 100% by weight.

The alkenyl arenes in the blocks A are preferably monoalkenyl arenes. The term "monoalkenyl arene" will be taken to include particularly those of the benzene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other mono-alkenyl polycyclic aromatic compounds such as vinyl naphthalene, vinyl anthracene and the like. The preferred monoalkenyl arenes are monovinyl monocyclic arenes such as styrene and alpha-methylstyrene, and styrene is particularly preferred.

The blocks B may comprise homopolymers of conjugated diene monomers, copolymers of two or more conjugated dienes, and copolymers of at least one of the dienes with at least one monoalkenyl arene as long as the blocks B at least predominate in conjugated diene units. Preferably, the amounts of randomly copolymerized alkenyl arene mers or short runs (sequences) of such mers is minimized due to the retarding effect such mers have on radiation cure, preferably less than about 10% by weight of the blocks B and yet more preferably 0% by weight.

The conjugated dienes are preferably ones containing from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like. Mixtures of such conjugated dienes may also be used. The preferred conjugated dienes are butadiene and isoprene.

Preferably, the block copolymers of conjugated dienes and alkenyl arene hydrocarbons which may be utilized include any of those which exhibit elastomeric properties. Such block copolymers may contain various ratios of conjugated dienes to alkenyl arenes. The proportion of the alkenyl arene blocks is preferably between about 1 and about 60 percent by weight of the block copolymer, more preferably between about 1 and about 55 percent by weight and yet more preferably between about 5 and about 40 percent by weight. When the alkenyl arene content is not more than about 60 percent by weight, preferably not more than about 55 percent by weight, the block copolymer has characteristics as a thermoplastic elastomer; and, conversely, when the alkenyl arene content is greater than about 60 percent by weight, preferably more than about 70 percent by weight, the block copolymer has characteristics as a resinous polymer.

In adhesive compositions, the proportion of the alkenyl arene blocks is preferably further reduced. The purpose of the further reduction is to enhance the probability of covalent crosslinking within the conjugated diene blocks at lower irradiation dosages, yet still take advantage of the physical crosslinking afforded by the alkenyl arene domains without significantly compromising tack. Thus, the proportion of the alkenyl arene blocks is preferably from about 3% to about 35%, more preferably from about 5% to about 15%, by weight.

The average molecular weights of the individual blocks may vary within certain limits. In most instances, the alkenyl arene blocks (blocks A) will have average molecular weights in the order of from about 3,000 to about 125,000, preferably from about 5,000 to about 30,000, and most preferably from about 8,000 to about 20,000; while the conjugated diene blocks (blocks B) will have average molecular weights in the order of from about 10,000 to about 250,000, preferably from about 20,000 to about 130,000, and most preferably from about 40,000 to about 100,000. The total weight average molecular weight of the poly (conjugated diene) portion of the block copolymer is at least about 0.3 million, and preferably from about 0.4 million to about 2.5 million, and most preferably from about 0.8 million to about 1.8 million. These molecular weights are most accurately determined by gel permeation chromatography—low angle laser light scattering (GPC-LALLS).

Generally, it has been found that the greater the molecular weight of the block copolymer, the lower the irradiation dosage required to attain a satisfactory cure. A satisfactory cure is generally believed to be attained when the composition possesses at least about 60% polymer gel content. With respect to commercial yardsticks, adhesives requiring more than about 5 to about 7 Mrads to reach the 60% gel threshold will not be of much value commercially.

Furthermore, the microstructure of the poly (conjugated diene) portion may be utilized to vary the probability of covalent crosslinking of the block copolymer, thereby affecting the amount of irradiation required to attain a satisfactory cure. For example, high vinyl polybutadiene (1,2 microstructure) and high vinyl polyisoprene (3,4 microstructure) are believed to cure at a lower irradiation dosage than their low vinyl counterparts, i.e., 1,4 polybutadiene and 1,4 polyisoprene, respectively. Not wishing to be bound to any particular theory, the foregoing may conveniently be rationalized in terms of the crosslinking theory presented by Charlesby in "Atomic Radiation and Polymers", Pergamon Press Ltd., 1960 and measurements of G (crosslink) by Bohm and others for natural rubber, polyisoprene, and polystyrene. G (crosslink) is the number of crosslinks per 100 eV absorbed by the polymer. The solubility of the polymer depends upon the molecular weight of the polymer and the probability of an individual molecule being linked to its neighbor. The relevant variable here is the average number of crosslinks per molecule. The elastic modulus and swelling depend upon the density of crosslinks. Charlesby demonstrated that the solubility of linear homopolymers as measured by the sol fraction is related to the nature of the polymer, the molecular weight of the polymer, and the irradiation dosage by the following equation:

$$s + s^{\frac{1}{2}} = p_o/q_o + 1/q_o u_1 r$$

where "s" is the sol fraction, "$p_o$" is the probability of a mer being a fracture site per unit dose, "$q_o$" is the probability of a mer being a crosslink site per unit dose, "$u_1$" is the number average degree of polymerization, and "r" is the irradiation dosage in Mrad. G (crosslink) [G(X)] and G(fracture) [G(F)] are related to "$q_o$" and "$p_o$" according to the following equations:

$$G(X) = (0.48 \times 10^6) q_o / w$$

$$G(F) = (0.96 \times 10^6) p_o / w$$

where "w" is the molecular weight of a mer.

The following values have been obtained by various workers for the values of G(X) and G(F).

TABLE 1

| Polymer | G(X) | $q_o{}^a$ | G(F) | $P_o{}^a$ |
| --- | --- | --- | --- | --- |
| Natural rubber | 1.1 to 1.9 | 1.6 E-4 to 2.7 E-4 | 0.22 | 1.6 E-5 |
| 1,4 polyisoprene | 0.9 to 2.0 | 1.3 E-4 to 2.8 E-4 | 0.22 | 1.6 E-5 |
| High 3,4 polyisoprene | 13 to 38 | — | — | — |
| 1,4 polybutadiene | 2 to 3.8 | 2.3 E-4 to 4.3 E-4 | 0 | 0 |
| High 1,2 polybutadiene | 10 | — | — | — |
| Polystyrene | 0.036 | 7.8 E-6 | 0.01 | 1 E-6 |
| Poly(p-methylstyrene) | 0.061 | 1.5 E-5 | — | — |

$^a$"E" and the number following same stands for a power 10; e.g., 1.6 E-4 is 1.6 × $10^{-4}$ From Table 1, it is apparent that high vinyl conjugated diene homopolymers are more sensitive to curing when subjected to irradiation. Within a polymerized conjugated diene block, two modes of polymerization are possible and generally observed. In what is termed high vinyl polymerization, the polymerization involves only one carbon-carbon double bond of the conjugated diene monomer. The carbon atoms of that bond will be incorporated within the polymer chain which will then contain a pendant vinyl group. The pendant vinyl groups are then readily available for covalent crosslinking. Examples of these type of polymerization are high 3,4 polyisoprene and high 1,2 polybutadiene. In what is termed low vinyl polymerization, the polymerization involves both carbon-carbon double bonds of the conjugated diene which add head to tail. Each conjugated diene monomer which adds in this manner will have a carbon-carbon double bond at the 2,3 carbons therein.

As such, the ethylenic unsaturation of low vinyl polymerization resides in the backbone of the polymer, rather than on a pendent group as in high vinyl polymerization. The foregoing provides a basis for rationalizing the difference in G(X) values between poly(conjugated dienes) produced by low versus high vinyl polymerization. Control of the two modes of polymerization is within the skill of the art.

On the basis of the foregoing, either low or high vinyl polymerized poly(conjugated dienes) may be utilized in the branched block copolymers of the present invention. However, as the vinyl content is increased in the branched block copolymer, the irradiation dosages for substantially the same level of cure are expected to decrease. Thus, as the minimum poly(conjugated diene) molecular weights are approached, an increasing amount of vinyl content is preferred. However, it should be noted that in pressure sensitive adhesive applications high vinyl content has the drawback of reducing tack. On the otherhand, it is well within the skill of the art to enhance tack by the addition of suitable tackifying resins.

The block copolymer may be produced by any well known block polymerization or copolymerization procedures including the well known sequential addition of monomer techniques, incremental addition of monomer technique or coupling technique as illustrated in, for example, U.S. Pat. Nos. Re 28,246; 3,239,478; 3,251,905; 3,390,207; 3,427,269; 3,598,887; 4,219,627; and in many other U.S. and foreign patents. The disclosures of the foregoing identified U.S. Patents are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference.

The polymers of the present invention are preferably produced by anionic polymerization employing an organomonolithium initiator. Typically, the first step of the process involves contacting, for example, a monoalkenyl arene and the organomonolithium compound (initiator) in the presence of an inert diluent therein forming a living polymer compound having the simplified structure A-Li. The inert diluent may be an aromatic or naphthenic hydrocarbon, e.g., benzene, or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the polymerizable additive in the first step of this process are represented by the formula RLi; wherein R is an aliphatic, cycloaliphatic, or aromatic radical, or combinations thereof, preferably containing from 1 to 20 carbon atoms per molecule. Exemplary of these organomonolithium compounds are ethyllithium, n-propyllithium, isopropyllithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptylcyclohexyllithium, 4-cyclopentylbutyllithium, and the like. The alkyllithium compounds are preferred for employment according to this invention, especially those wherein the alkyl group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of about $-60°$ F. to about $+300°$ F. and at pressures which are sufficient to maintain the reaction mixture in the liquid phase.

Next, the living polymer in solution is contacted with a conjugated diene. The resulting living polymer has a simplified structure A-B-Li.

The living AB-Li polymer arms are then reacted with a multifunctional coupling agent.

Similarly, living polymers having a simplified structure of B-Li, B-A-Li, B-A-B-Li, A-B-A-Li, etc. may be prepared. If prepared in a separate reactor employing an inert solvent, organolithium initiator and respective monomer or monomer sequence, combinations of these polymer arms may also then be reacted with a multifunctional coupling agent to form an asymmetric branched block copolymer.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like disclosed in U.S. Pat. No. 3,281,383. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkylthio, arylthio, and tertiary amino groups. Many suitable types of these polyfunctional compounds have been described in U.S. Pat. Nos. 3,595,941; 3,468,972; 3,135,716; 3,078,254; and 3,594,452. Other polyfunctional coupling agents include the silicon halides, e.g. chlorosilanes, and the like disclosed in U.S. Pat. No. 3,244,664.

A much preferred coupling agent is a polyalkenyl aromatic coupling agent. Polyalkenyl aromatic coupling agents capable of forming star-shaped polymers are known in the art. See generally Milkovich, Canadian Pat. No. 716,645; Crossland et al., U.S. Pat. No. 4,010,226; Fetters et al., U.S. Pat. No. 3,985,830; and St. Clair et al., U.S. Pat. Nos. 4,391,949 and 4,444,953.

The polyalkenyl aromatic compounds that are employed in this step of the process are those polyvinyl aromatic compounds that have any of the following general formulas:

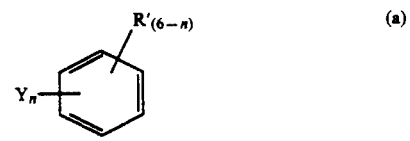
(a)

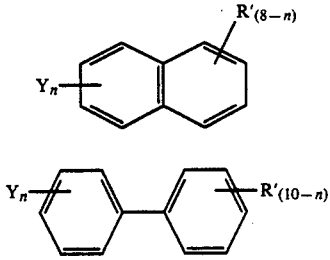

wherein Y is a vinyl group, and wherein each R' is hydrogen or an alkyl group containing from 1 to 4 carbon atoms with a total of the alkyl substituents having not more than 12 carbon atoms, and wherein n is an integer of 2 or 3. The vinyl substituents in the above formulas (b) and (c) can be on one or both rings. Exemplary of suitable polyvinyl aromatic compounds are
1,2-divinylbenzene;
1,3-divinylbenzene;
1,4-divinylbenzene;
1,2,4-trivinylbenzene;
1,3-divinylnaphthalene;
1,8-divinylnaphthalene;
1,3,5-trivinylnaphthalene;
2,4-divinylbiphenyl;
3,5,4'-trivinylbiphenyl;
1,2-divinyl-3,4-dimethylbenzene;
1,5,6-trivinyl-3,7-diethylnaphthalene;
1,3-divinyl-4,5,6-tributylnaphthalene;
2,2'-divinyl-4-ethyl-4'-propylbiphenyl;
and the like. Divinyl aromatic hydrocarbons containing up to 26 carbon atoms per molecule are preferred for employment according to this invention; particularly divinylbenzene in either its ortho, meta, or para isomer and commercial divinylbenzene which is a mixture of said isomers is also quite satisfactory.

The polyalkenyl aromatic coupling agent is preferably added to the living polymer after the polymerization of the monomers is substantially complete, i.e., the agent should only be added after substantially all of the monomer has been converted to living polymers.

The amount of polyalkenyl aromatic coupling agent added may vary between wide limits but preferably at least 0.5 mole is used per mole of unsaturated living polymer. Amounts of from 1 to 15 moles, preferably from 1.5 to 5 moles are preferred. The amount, which may be added in two or more stages, is usually such so as to convert at least 70% w of the living polymers into radial or star-shaped polymers, preferably at least 85% w.

The coupling reaction step may be carried out in the same solvent as for the polymerization reaction step. A list of suitable solvents is given above. The coupling reaction step temperature may also vary between wide limits, e.g., from about 0° C. to about 150° C., preferably from about 20° C. to about 120° C. The reaction may also take place in an inert atmosphere, e.g., nitrogen, and under pressure, e.g., a pressure of from about 0.5 to about 10 bars.

The radial or star-shaped polymers prepared in the coupling reaction step above are characterized by having a center or nucleus of crosslinked poly(polyalkenyl coupling agent) and a number of arms of substantially linear unsaturated polymers extending outwardly therefrom. The number of arms may vary considerably but is typically between 3 and 40, preferably from about 6 to about 30 and more preferably from about 10 to about 25. From the above it can be seen that X is preferably a poly (polyvinyl aromatic coupling agent) nucleus and more preferably a poly(divinylbenzene) nucleus. As stated above it is believed that the nuclei are crosslinked.

Following the coupling reaction the product is neutralized such as by the addition of terminators, e.g., water, alcohol or other reagents, for the purpose of removing the lithium radical forming the nucleus for the condensed polymer product. The product is then recovered such as by coagulation utilizing hot water or steam or both.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

B. B-Block Compatible Oligomers

For various purposes, such as enhancing tack or processibility of the compositions of the present invention, predominantly carbon-hydrogen based oligomers that are compatible with the blocks B of the branched block copolymer are incorporated into the composition. The oligomers include, for example, tackifying resins, plasticizers, oils, aliphatic waxes, and combinations thereof. However, in the present invention, it is essential that the amount of the unsaturated carbon atoms from these sources be minimized. By carefully controlling the unsaturation content in the composition from these sources, the composition is capable of being cured by exposure of commercially acceptable levels of irradiation without the aid of a radiation sensitive coupling agent to promote crosslinking of the branched block copolymer therein.

This unsaturation content is quantified in terms of a oligomer unsaturation index ($U_T$) defined by the following expression:

$$\sum_{i}^{t} (w_i)(U_i) = U_T$$

where:
"i" represents a particular oligomer in the composition,
"$w_i$" represents the weight fraction of the particular oligomer "i" based on the total weight of the branched block copolymer(s), and the oligomer(s),
"$U_i$" represents the unsaturation index of the particular oligomer "i" (units in %) as an equivalent percentage of unsaturated carbon atoms relative to the total carbon atoms therein,
"t" represents the total number of the oligomers in the composition, and
"$U_T$" represents the unsaturation index of the composition (units in %).

The unsaturation index of the oligomers ($U_T$) is equal to at most about 6%, preferably at most about 3%, and more preferably at most 1.5%.

Normally, the oligomers contain substantially only carbon and hydrogen and every two unsaturated carbon atoms correspond to one double bond. However, when double bonds occur between a carbon atom and a non-carbon atom, such as an oxygen, the correspondence between the number of unsaturated carbon atoms and multiple double bonds is upset. As a consequence, the unsaturation index for such oligomers requires adjustment or compensation to an equivalent value based upon carbon-hydrogen oligomers. An adequate correction is to 1) identify the portion of unsaturated carbons bonded via a double bond to a non-carbon atom, 2) double its value, and 3) add it to the portion due to carbon-carbon unsaturation.

The percentage of the carbon atoms that are unsaturated in each oligomer may be determined by quantitative $C^{13}$-N.M.R. if the structure of the oligomer is not known beforehand. In $C^{13}$-N.M.R., the unsaturated carbon fraction is the integration of all signals from 200 ppm to 100 ppm chemical shift relative to the integration of all signals from 200 ppm to 100 ppm plus 75 ppm to 5 ppm (with tetramethylsilane (TMS) at 0 ppm in chloroform solvent). The signal due to unsaturated carbon atoms bonded to non-carbon atoms, such as oxygen, may be identified by one skilled in N.M.R. and the fraction thereof determined. The fraction of unsaturated carbons in the respective oligomer is then multiplied by 100 to yield the percentage of unsaturated carbons therein. This percentage of unsaturated carbons is denoted as the unsaturation index of the respective oligomer, $U_i$. Table 2 provides a list of typical tackifying resins and oils and their corresponding unsaturation index $(U_i)$.

TABLE 2

| Oligomers | Oligomer Unsaturation Index[g] (%) |
|---|---|
| Tackifying Resins: | |
| Escorez ® 5380[b] | 1< |
| Regalrez ® 1018[c] | 6 |
| Adtac ® B10[c] | 11 |
| Escorez ® 1310LC[b] | 13 |
| Wingtack ® 95[d] | 14 |
| Wingtack ® Plus[d] | 17 |
| Wingtack ® 10[d] | 16 |
| Floral ® 85[c] | 19[a] |
| Wingtack ® 86[d] | 34 |
| Piccovar ® AP-25[c] | 36 |
| Oils: | |
| Tufflo ® 6056[e] | 1< |
| Shellflex ® 371[f] | 1 |

[a]Includes 5% in oxygenated carbons which have been doubled and 9% in regular unsaturated carbons.
[b]Available from Exxon Chemical.
[c]Available from Hercules.
[d]Available from Goodyear Chemical.
[e]Available from Atlantic Richfield Co.
[f]Available from Shell Chemical.
[g]Determined utilizing $C^{13}$-N.M.R., except for Tufflo ® 6056 which is determined utilizing its structure.

As earlier noted, the amount of poly(alkenyl arene) in the branched block copolymers may vary from about 1 to about 60 percent. In general, the amount of poly(alkenyl arene) for example polystyrene in the branched block copolymer within the limits specified does not appreciably affect the irradiation cure dosage required even though polystyrene has an unsaturation index of 75%, i.e., 75% of the carbon atoms therein are unsaturated. The foregoing phenomena results from the polystyrene being micro-phase separated from the poly(conjugated diene) portion of the branched block copolymer, unlike the B block compatible oligomers which intimately mix therewith on a molecular level. This suggests that polymers with very small blocks or sequences of polystyrene (about 500 to about 5000 molecular weight) may interfere with cure as these sequences or small blocks of polystyrene may not entirely phase separate, but may being intermixing on a molecular level. Therefore, it is preferred that polymers requiring a very low amount of poly(alkenyl arene) be made asymmetric to a block size which will tend to properly phase separate and not interfere with cure. If the poly(alkenyl arene) blocks or sequences are allowed to become small enough to allow some molecular mixing, the weight fraction of those potentially interfering blocks and sequences may be quantified, or at least estimated, and accounted for in the determination of the total oligomer unsaturation index $(U_T)$. Alternatively, the total oligomer unsaturation index $(U_T)$ may be maintained at lower levels in such situations to allow gel formation at low irradiation dosages without explicitly including the effect of these potentially interfering blocks and sequences in the determination of the composition unsaturation index.

1. Tackifying Resins

The block copolymer (rubber) by itself is not sufficiently tacky or sticky. Therefore, it is necessary to add a tackifying resin that is compatible with the elastomeric conjugated diene blocks. However, in the present invention, it is preferable that the tackifying resin have a low level of unsaturation in order to achieve low dosage radiation curing of the composition. Mixtures of resins having higher and lower unsaturations and softening points may also be used. Examples of resins which are useful in the compositions of this invention include unsaturated and hydrogenated resins, esters of resins, polyterpenes, terephenol resins, and polymerized mixed olefins with hydrogenated resins preferred. The amount of tackifying resin or resins in total varies from about 0 to about 1000 parts per hundred rubber (phr), preferably from about 5 to about 500 phr and more preferably from about 50 and about 250 phr, so long as the prescribed limits of the total oligomer unsaturation index $(U_T)$ are satisfied.

Optionally, a tackifying resin that is compatible with the alkenyl arene blocks may be added so long as it does not appreciably hinder the radiation curing process as a result of mixing on a molecular level with the poly(conjugated diene) blocks. Compatibility is judged by the method disclosed in U.S. Pat. No. 3,917,607. Normally, the resin should have a softening point above about 100° C. as determined by ASTM method E28, using a ring and ball apparatus. Mixtures of arene-block-compatible resins having high and low softening points may also be used. Useful resins include coumarone-indene resins, polystyrene resins, vinyl toluene-alphamethylstyrene copolymers, and polyindene resins. Much preferred is a coumarone-indene resin. The amount of arene-block-compatible resin varies from about 0 to about 200 phr, preferably from about 0 to 50 phr. However, if appreciable molecular mixing of the A block compatible tackifying resin occurs within the B block portion of the branched block copolymer, the fraction of the tackifying resin should be factored into the determination of the total oligomer unsaturation index $(U_T)$.

2. Plasticizers and Oils

The adhesive compositions of the instant invention may also contain plasticizers such as rubber extending or compounding oils in order to provide wetting action and/or viscosity control. These plasticizers are well-known in the art and may include both high saturates content and high aromatic content oils. The above broadly includes not only the usual plasticizers but also contemplates the use of olefin oligomers and low molecular weight polymers as well as vegetable and animal oil and their derivatives. The petroleum derived oils which may be employed are relatively high boiling materials and preferably contain only a minor proportion of aromatic hydrocarbons (preferably less than 30 percent and, more preferably, less than 15 percent by weight of the oil). Alternatively, the oil may be totally non-aromatic. The oligomers may be polypropylene, polybutene, hydrogenated polyisoprene, hydrogenated polybutadiene, or the like having average weights preferably between about 200 and about 10,000. Vegetable and animal oils include glyceryl esters of the usual fatty acids and polymerization products thereof.

However, in the present invention, the best results (i.e., satisfactory cure achieved with minimum irradiation dosage) are achieved when, like the tackifying resins, the plasticers and oils contain low levels of unsaturation. Additionally, it is also preferable to minimize the aromatic contents thereof.

The amount of plasticizer and oil employed varies from 0 to about 2000 phr, preferably from 0 to about 1000 phr and more preferably from 0 to about 250 phr, and most preferably from 0 to about 60 phr so long as the prescribed limits of the total oligomer unsaturation index ($U_T$) are satisfied.

3. Petroleum Derived Waxes

Various petroleum derived waxes may also be present in the composition in order to impart fluidity in the molten condition of the adhesive and flexibility to the set adhesive, and to serve as a wetting agent for bonding cellulosic fibers. The term "petroleum derived wax" includes both paraffin and microcrystalline waxes having melting points within the range of about 130° to about 225° F. as well as synthetic waxes such as low molecular weight polyethylene or Fisher-Tropsch waxes.

The amount of petroleum derived waxes employed herein varies from 0 to about 100 phr, preferably from 0 to about 15 phr, so long as the prescribed limits of the total oligomer unsaturation index ($U_T$) are satisfied.

C. Crosslink Promoters (Irradiation Sensitive Coupling Agents)

Though not an essential component of the present invention, crosslink promoters may be utilized to possibly enhance even further the rate at which the cure is performed and/or allow an even further decrease in the irradiation dosage required to satisfactorily cure the compositions herein. These crosslink promoters are cure promoting coupling agents which are activated by ionizing radiation. There are two major types of such crosslink promoters.

The first type of additive consists of catalyst-type promoters which do not enter directly into the crosslinking reaction but act to enhance the production of reactive species, such as free radicals which then lead to the formation of crosslinks. Such "indirect crosslink promoters" which have been studied include among others halides; nitrous oxide; sulfur monochloride; metal oxides, such as zinc oxide and anitmony oxide (promotes flame retardance); litharge; and magnesia. The presence of indirect crosslink promoters effectively increase the G(X) value.

The second type of additive consists of crosslink promoters which enter directly into the crosslinking reaction and become the molecular link between two polymer chains. Such "direct crosslink promoters" include maleimides, thiols, acrylic and allylic compounds, for example, triallyl phosphate. Acrylates have been found to be more reactive than allylics. Examples of such acrylates are the polyfunctional acrylate and methacrylate coupling agents disclosed in Hansen et al., U.S. Pat. No. 4,133,731, and Korpman, U.S. Pat. No. 4,432,848.

The amount of crosslink promoter which may be employed varies from 0 phr to about 50 phr, preferably 0 phr to about 15 phr. However, as earlier noted, such crosslink promoters tend to be irritants and/or toxic and are preferably avoided being that such are not necessary to achieve a satisfactory cure with an economically attractive irradiation dosage.

D. Supplementary Materials

The compositions of this invention may be modified with supplementary materials including pigments, fillers, and the like as well as stabilizers and oxidation inhibitors. Stabilizers and oxidation inhibitors are typically added to the commercially available compounds in order to protect the polymers against degradation during preparation and use of the adhesive composition. Combinations of stabilizers are often more effective, due to the different mechanisms of degradation to which various polymers are subject. Certain hindered phenols, organo-metallic compounds, aromatic amines and sulfur compounds are useful for this purpose. Especially effective types of these materials include the following:
1. Benzothiazoles, such as 2-(dialkyl-hydroxybenzylthio)benzothiazoles.
2. Esters of hydroxybenzyl alcohols, such as benzoates, phthalates, stearates, adipates or acrylates of 3,5-dialkyl-1 hydroxybenzyl alcohols.
3. Stannous phenyl catecholates.
4. Zinc dialkyl dithiocarbamates.
5. Alkyl phenols, e.g., 2,6-di-tert-butyl-4-methyl phenol.
6. Dilaurylthio-dipropionate.

Examples of commercially available antioxidants are "Ionox 220" 4,4-methylene-bis(2,6-di-t-butyl-phenol) and "Ionox 330" 3,4,6-tris(3,5-di-t-butyl-p-hydroxybenzyl)-1,3,5-trimethylbenzene, "Dalpac 4C" 2,6-di-(t-butyl)-p-cresol, "Naugawhite" alkylated bisphenol, "Butyl Zimate" zinc dibutyl dithiocarbamate, and "Agerite Geltrol" alkylated-arylated bis-phenolic phosphite. From about 0.01 percent to about 5.0 percent by weight of one or more antioxidants is generally added to the adhesive composition.

Being that such stabilizers and oxidation inhibitors are added primarily to protect the poly(conjugated diene) portion of the branched block copolymer, such materials shall be molecularly mixed therewith. Further, as is readily apparent from the foregoing, such materials contain unsaturation. Thus, it is preferred that the unsaturation indices of the materials be accounted for in determining the unsaturation index of the oligomers ($U_T$) when the amount thereof exceeds about 1 phr by including the multiplication product of the weight fraction ($w_i$) thereof and its corresponding unsaturation index ($U_i$).

E. Preparation and Use

The adhesive compositions of the present invention may be applied to the substrate from a solution of up to about 60% weight solids of the ingredients in a solvent such as toluene, the solvent being removed by evaporation prior to crosslinking by exposure to the radiation. Alternatively, the ingredients may be mixed in a solvent, the mixture may be emulsified and the solvent evaporated, and the adhesive may be applied to the substrate as a 60–70% weight solids water-based emulsion, the water being removed by evaporation prior to crosslinking. Adhesives of the present invention are especially suited for preparation as 100% solids hot melt adhesives since they give relatively low processing viscosities, less than several hundred thousand centipoise, and adequate pot life, up to several hours, at processing temperatures of about 150° C. to about 180° C. A preferred method for processing these adhesives to minimize gel formation during hot melt processing is to use an extruder to mix the adhesive and feed the coating die as is disclosed in Korpman U.S. Pat. No. 3,984,509.

The compositions of the present invention are cured by exposure to high energy ionizing radiation such as electron beam radiation.

The electron beam radiation or high energy ionizing radiation which is employed to effect the crosslinking reaction can be obtained from any suitable source such as an atomic pile, a resonant transformer accelerator, a Van de Graaf electron accelerator, a Linac electron accelerator, a betatron, a synchrotron, a cyclotron, or the like. Radiation from these sources will produce ionizing radiation such as electrons, protrons, neutrons, deuterons, gamma rays, X rays, alpha particles, and beta particles.

The crosslinking reaction is conveniently effected at room temperature, but it can be conducted at depressed or elevated temperatures if desired. It is also within the spirit and scope of the invention to effect the crosslinking reaction within the confines of an inert atmosphere to prevent oxidative degradation of the block copolymer, particularly at an exposed surface. Additionally, crosslinking may be effected by irradiating the composition which is sandwiched between substrates such as when the composition is utilized as a tie-layer between these substrates. Similarly, when the crosslinking reaction is not conducted within the confines of an inert atmosphere, release paper may be placed over the exposed composition surface contacting and covering same. Thus, the composition may be crosslinked by irradiation through the release paper without worry of oxidizing the surface of the composition. On the other hand, an oxidized surface may be beneficial and desirous in a coatings application.

The amount of irradiation required to produce a satisfactory cure depends primarily upon the type and concentration of the block copolymer employed and the total oligomer unsaturation index ($U_T$). Suitable dosages of electron beam irradiation include about 1 Mrad to about 20 Mrad, preferably about 1 Mrad to about 7 Mrad and more preferably about 1 Mrad to about 3 Mrads. It should be noted that irradiation dosages of about 1 Mrad and possibly less are believed attainable herein with the aid of crosslink promoters.

A preferred use of the present formulation is in the preparation of pressure-sensitive adhesive (PSA) tapes or in the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

EXAMPLES

The invention is further illustrated by means of the following illustrative examples, which are given for the purpose of illustration alone and are not meant to limit the invention to the particular reactants and amounts disclosed.

For the purposes of comparison, test films of formulations within and outside the scope of the present invention were prepared by dissolving the formulation ingredients in toluene and casting the formulations onto 25 micron thick Mylar ® sheets. After air drying in a hood for 1 hour, the samples were dried in a 40° C. vacuum oven. By casting from toluene, a good solvent for all of the components of the formulations, the morphologies of the PSA films after solvent evaporation reasonably emulate those obtained from 100% solids hot melt application. The test films were then stored at constant temperature and humidity (23° C., 50% relative humidity) prior to electron beam curing. Electron beam (EB) curing was done using an Energy Sciences laboratory model CB150 Electrocurtain ® system. 165 Kev electrons and an inert atmosphere were used. The EB dose was varied by adjusting the magnitude of the electron beam current. The beam was directed against the adhesive surface. Testing was done to determine the test adhesives radiation responsiveness, solvent resistance, and high temperature performance. These tests included:

1) Polymer gel content: The polymer gel content test is the primary test used to quantify the radiation responsiveness and solvent resistance of a formulation. It measures the weight percent of the polymer that is not soluble in toluene and quantifies the covalent network formation caused by the radiation treatment. Unirradiated SIS and SBS based PSA's will completely dissolve in this test. Irradiated PSA's based on conventional SIS and SBS polymers also completely dissolve, unless an extreme EB dose is used. Consistently, improved elevated temperature properties and solvent resistance require the gel content to be about 60% or greater. The gel test is described in the paper "Experimental Thermoplastic Rubbers for Enhanced Radiation Crosslinking of Hot Melt PSA's" by J. R. Erickson, presented at the 1985 TAPPI Hot Melt Symposium, May 1985.

2) Shear Adhesion Failure Temperature (SAFT): SAFT is defined as the temperature at which 1 in. x. 1 in. overlap shear bond of the test adhesive tape to a Mylar ® substrate fails under a specified load, when placed in a cabinet whose temperature is increased by 22° C. per hour. A load of 1 kilogram was utilized.

3) 95° C. Holding Power: 95° C. Holding Power is the time at which a 1 in. x. 1 in. overlap shear bond of the test adhesive tape to a Mylar ® substrate fails under a specified load when placed in a cabinet whose temperature is held constant at 95° C. Loads of 500 gram and 1 kilogram were used in the examples.

In the embodiments and examples, the following materials were employed:

I. Block Copolymers

A. Polymer 1: A symmetric star-shaped SIS polymer from Shell Development Company prepared using an alkenyl arene based coupling agent, and having about 18 arms, a weight average molecular weight of about 1.2 million, and a polystyrene content of about 10% by weight.

B. Polymer 2: An asymmetric star-shaped SIS polymer from Shell Development Company prepared using an alkenyl arene based coupling agent, and having about 18 arms, a weight average molecular weight of about 1.2 million, and a polystyrene content of about 10% by weight.

C. Polymer 3: A symmetric radial SBS polymer from Shell Chemical Company prepared using a tetrafunctional coupling agent, having about 4 arms, a weight average molecular weight of about 0.18 million and an polystyrene content of about 23% by weight.

D. Polymer 4: A linear SBSBS polymer from Firestone (Stereon® 840A) believed to be sequentially formed, and having a weight average molecular weight of about 0.10 million, and a polystyrene content of about 43% by weight. See U.S. Pat. No. 4,526,577.

E. Polymer 5: A commercially available star-shaped SIS polymer from Shell Chemical Company (Kraton® D 1320X rubber) prepared using an alkenyl arene based coupling agent and having greater than about 6 arms, but less than about 40 arms, a weight average molecular weight of about 1.2 million, and a polystyrene content of about 10% by weight.

II. B-Block Compatible Resins and Oil

A. Tufflo® 6056: A paraffinic process oil from Atlantic Richfield Co. A liquid with a Tg of about −64° C. and a molecular weight of about 530.

B. Escorez® 5380: A hydrogenated hydrocarbon resin from Exxon Chemical. A solid resin with Tg of about 29° C. and softening point of 80° C.

C. Shellflex® 371: A paraffinic-naphthenic oil from Shell Chemical. A liquid with a Tg of about −64° C.

D. Regalrez® 1018: A hydrogenated hydrocarbon resin from Hercules. A liquid resin with Tg of about −25° C. and softening point of 18° C.

E. Adtac® B10: A aliphatic hydrocarbon resin from Hercules. A liquid resin with Tg of about −48° C. and softening point of 10° C.

F. Escorez® 1310LC: A C5 hydrocarbon resin from Exxon Chemical. A solid resin with Tg of about 42° C. and softening point of 94° C.

G. Wingtack® 95: A C5 hydrocarbon resin from Goodyear Chemical. A solid resin with Tg of about 51° C. and softening point of 95° C.

H. Wingtack® 10: A C5 hydrocarbon resin from Goodyear Chemical. A liquid resin with a Tg of about −28° C. and a softening point of 10° to 15° C.

I. Foral® 85: A glycerine rosen ester resin from Hercules. A solid resin with Tg of about 40° C. and softening point of 85° C.

J. Piccovar® AP25: A low molecular weight alkylaryl resin derived from aromatic petroleum feedstocks from Hercules. A liquid resin with Tg of about −21° C. and softening point of 25° C.

III. Stabilizers and Antioxidants

A. Ionol®: A phenolic antioxidant from Shell International having the formula 2,6-di-tertiary-butyl-4-methyl phenol (BHT).

B. Antioxidant 330®: A phenolic antioxidant from the Ethyl Corporation having the formula 1,3,5-trimethyl-2,4,6-tris-(3′,5′-di-tertiary-butyl-4′-hydroxybenzyl) benzene.

C. Polygard® HR: A tris-(nonylated phenyl) phosphite from Uniroyal, Naugatuck Chemical Division, U.S.A., described as being a tris-(mixed mono- and di-nonylphenyl) phosphite (Polygard Technical Bulletin No. 15; March 1964, ex Uniroyal).

EXAMPLE 1

Effect of Composition Unsaturation

In this example, Polymer 1 was formulated with various tackifying resins as shown in Table 3 at a fixed polymer to tackifying ratio of 45:55 to obtain adhesive compositions Samples A, B and C having the same B block/resin Tg, but varying the total oligomer unsaturation index ($U_T$). The weight average molecular weight (Mw) of the diene portion of Polymer 1 was about 1.1 million, since the weight average molecular weight of the entire polymer was about 1.2 million and the polystyrene content was about 10%. Test films of each of these samples were subjected to varying doses of electron beam radiation, as shown in Table 3, and evaluated. The B block/resin Tg, was calculated using the Fox equation; namely, $$\frac{1}{Tg} = \sum_i \frac{wi}{Tgi}$$

As is readily apparent from Table 3 and FIG. 1, satisfactory cure is obtained at lower irradiation dosages as the total oligomer unsaturation index ($U_T$) is decreased. For example, referring to FIG. 1, a gel content of 70% is obtained at 4.8 Mrads at a $U_T$ of about 11.2%, while only 2.9 Mrad is needed at a $U_T$ of about 5.0%, and only 1.9 Mrad at a $U_T$ of about 0.8%. Likewise, referring to FIG. 1, a gel content of 80% is obtained with 4.8 Mrad at a $U_T$ of about 6.5%, while only 2.9 Mrad is needed at a $U_T$ of about 1.9%, and only 1.9 Mrad at a $U_T$ of about 0.1%. These results demonstrate the beneficial effect of decreasing the total oligomer unsaturation index ($U_T$) to 6.0% and below by achieving dramatic reductions in the required irradiation dosage to achieve equivalent levels of cure.

Figure 2:
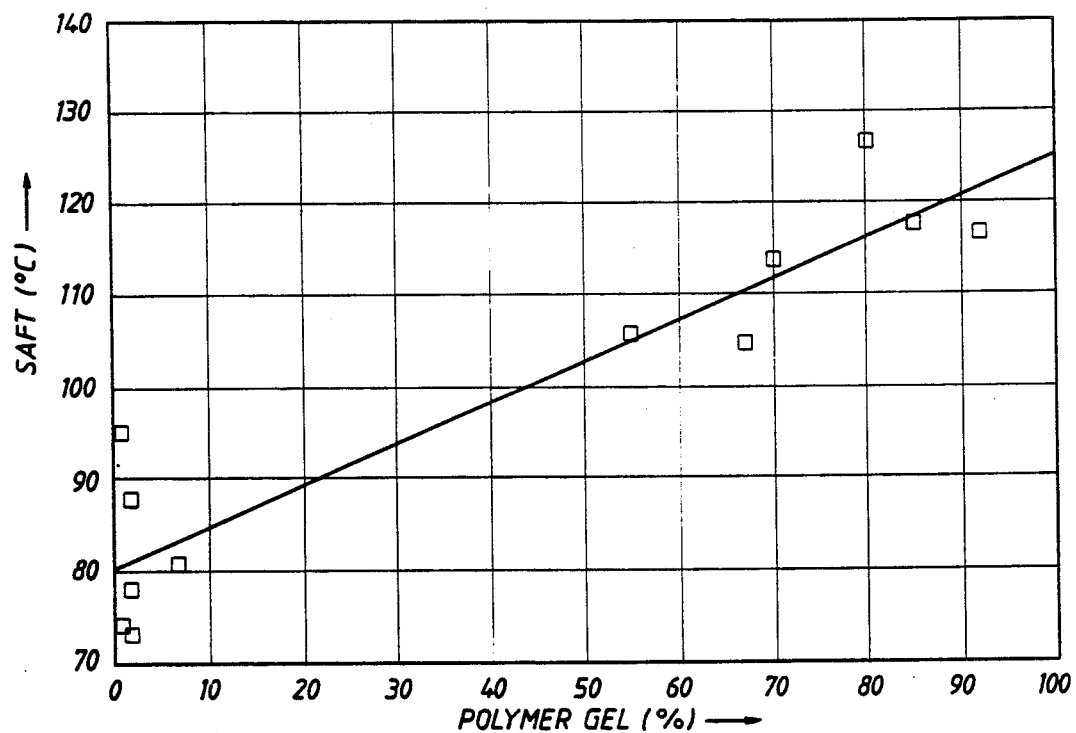
FIG. 2 is an x-y plot of SAFT (°C.) versus Polymer Gel (%).
Figure 3:
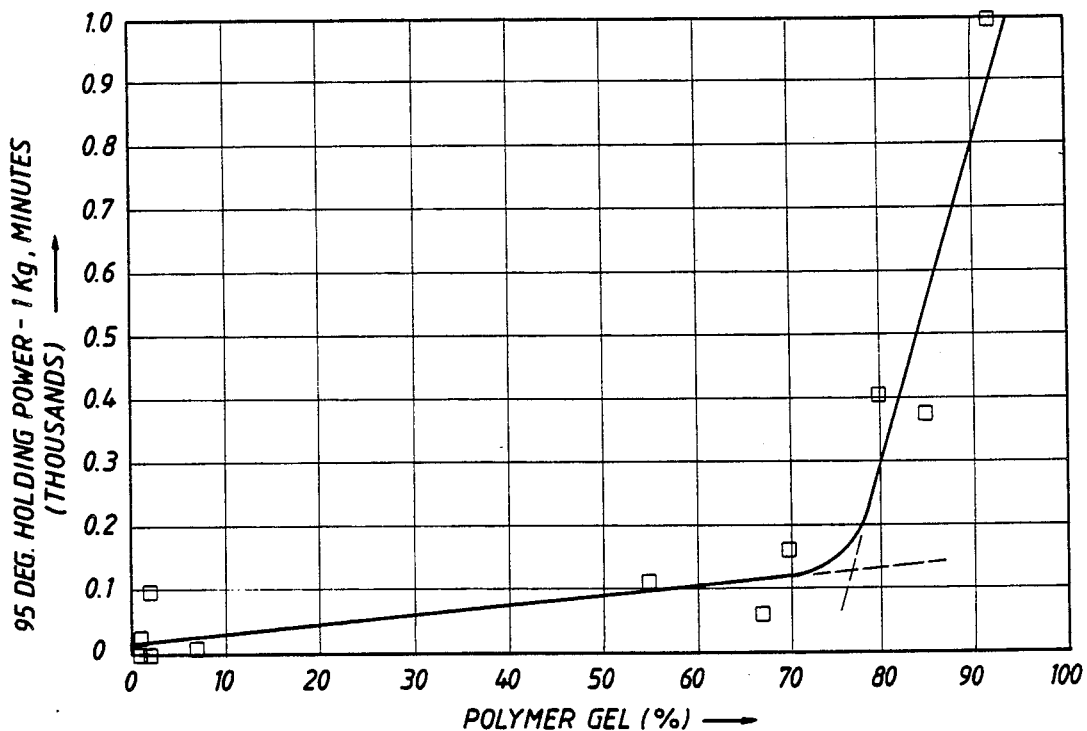
FIG. 3 is an x-y plot of 95° C. Holding Power utilizing a 1 kg. weight (minutes) versus Polymer Gel (%).
Figure 4:
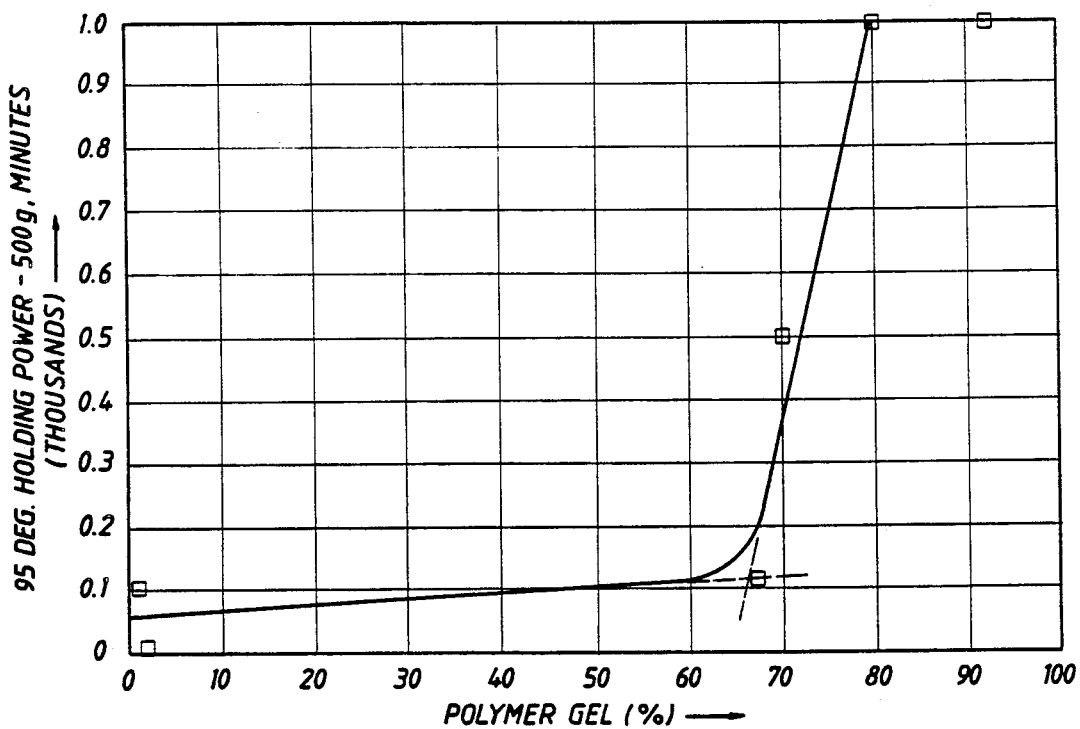
FIG. 4 is an x-y plot of 95° C. Holding Power utilizing a 500 g. weight (minutes) versus Polymer Gel (%).

FIGS. 2, 3 and 4 graphically present the relationship of SAFT and 95° C. Holding Power using 1 kg and 0.5 kg weights to Polymer Gel Content, respectively. For the most part, satisfactory properties are achieved at about 60% and better yet at about 70% polymer gel content.

TABLE 3

| Formulation (phb)$^a$ | Sample$^f$ | | |
|---|---|---|---|
| | A | B | C |
| Polymer: | | | |
| Polymer 1 | 45.00 | 45.00 | 45.00 |
| Oligomer: | | | |
| Escorez ® 5380 | 49.30 | | |
| Regalrez ® 1018 | 5.70 | | |
| Wingtack ® 95 | | 42.90 | 34.10 |
| Adtac ® B-10 | | 12.10 | |
| Piccovar ® AP-25 | | | 20.90 |
| Total | 100.00 | 100.00 | 100.00 |
| Antioxidant: | | | |
| Polygard ® HR | 0.23 | 0.23 | 0.23 |
| Total Oligomer Unsaturation Index, $U_T$ (%) | 0.7 | 7.3 | 12.3 |
| Polymer Gel Content (%)$^b$ | | | |
| Irradiation Dosage (Mrad) | | | |
| 0 | 2 | 2 | 1 |
| 1.9 | 70 | 1 | 2 |
| 2.9 | 85 | 55 | 7 |
| 4.8 | 92 | 80 | 67 |

TABLE 3-continued

| Formulation (phb)[a] | Sample[f] | | |
|---|---|---|---|
| | A | B | C |
| SAFT-Mylar ® (°C.)[c] | | | |
| Irradiation Dosage (Mrad) | | | |
| 0 | 73 | 88 | 74 |
| 1.9 | 114 | 95 | 78 |
| 2.9 | 118 | 106 | 81 |
| 4.8 | 117 | 127 | 105 |
| 95° C. Holding Power | | | |
| Mylar ® - 1 Kg (min.)[d] | | | |
| Irradiation Dosage (Mrad) | | | |
| 0 | 1 | 2 | 1 |
| 1.9 | 166 | 29 | 100 |
| 2.9 | 378 | 116 | 10 |
| 4.8 | >1000 | 410 | 63 |
| 95° C. Holding Power | | | |
| Mylar ® - 0.5 Kg (Mrad)[e] | | | |
| Irradiation Dosage (Mrad) | | | |
| 1.9 | 504 | 108 | 12 |
| 4.8 | >1000 | >1000 | 120 |

[a]Parts per hundred blend, wherein the blend constitutes the polymer component plus the oligomer component. As between the polymer and the oligomer components, phb is equivalent to weight percent thereof.
[b]Data plotted as FIG. 1.
[c]Data plotted as FIG. 2.
[d]Data plotted as FIG. 3.
[e]Data plotted as FIG. 4.
[f]Samples B and C are outside the scope of the present invention.

EXAMPLE 2

Effect of Polymer Structure and Molecular Weight

In this example, Polymer 2 (star with polyisoprene Mw of about 1.1 million), Polymer 3 (radial with polybutadiene Mw of about 0.14 million), and Polymer 4 (linear with polybutadiene Mw of about 0.06 million) were formulated with various tackifying resins as shown in Table 4 at a fixed polymer to tackifying resin ratio of 50:50 to obtain Samples D-G, H-L, and M-Q respectively. By utilizing different tackifying resins, the total oligomer unsaturation index ($U_T$) was varied. Test films of each of these samples were subjected to varying doses of electron beam radiation, as shown in Table 4, and evaluated with respect to polymer gel content.

Figure 5:
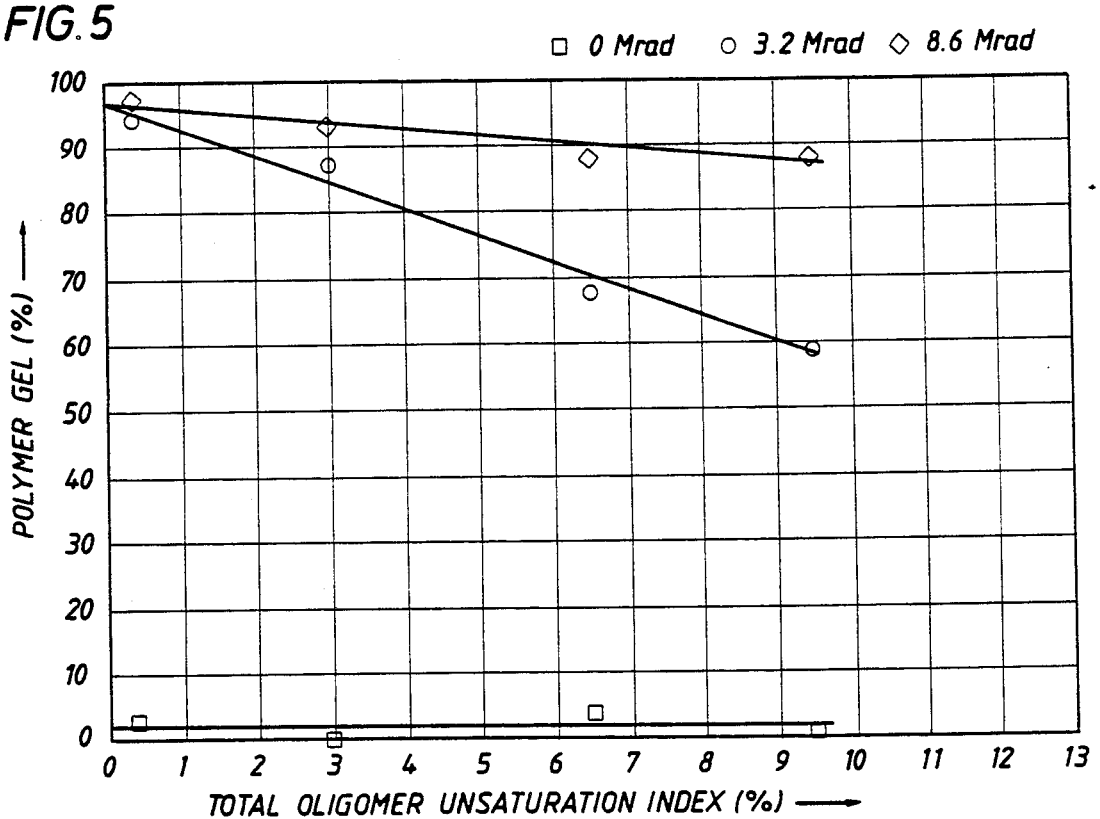
FIG. 5 is an x-y plot of Polymer Gel (%) versus Component Unsaturation Index, $U_T$, (%) at various electron beam irradiation dosages.
Figure 6:
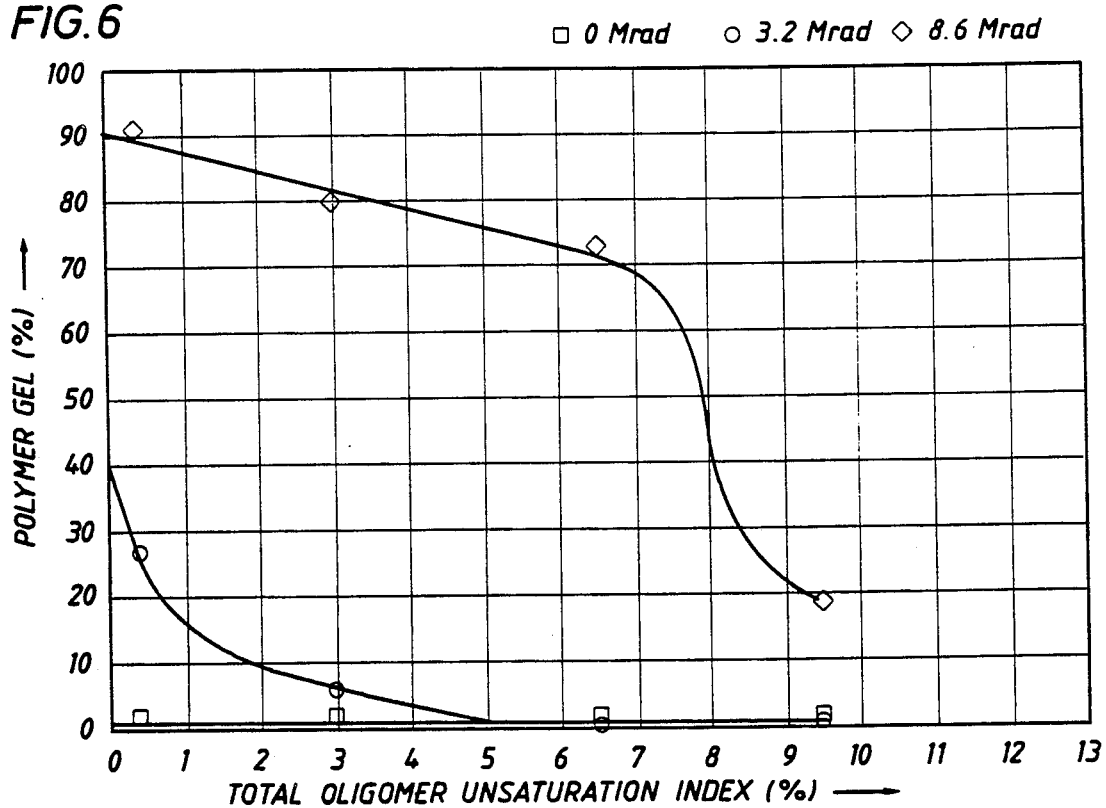
FIG. 6 is an x-y plot of Polymer Gel (%) versus Component Unsaturation Index, $U_T$, (%) at various electron beam irradiation dosages.

Several things are readily apparent from Table 4 and FIGS. 5-7. Firstly, regardless of the molecular weight of the poly(conjugated diene) portion of the respective polymer and associated structure, the effect of reducing the total oligomer unsaturation index ($U_T$) on reducing the irradiation dosage to effect equivalent levels of polymer gel content is evident even with relatively low molecular weight linear polymers. For example, in Samples M and N utilizing Polymer 4 (linear) at 8.6 Mrad dosage (FIG. 7), a dramatic increase in polymer gel content is observed, from 6% to 53%, when $U_T$ is reduced from 3% to 0.4%. A similar dramatic increase in polymer gel content is observed, from 19% to 73%, in Samples K and L at 8.6 Mrad dosage (FIG. 6) when $U_T$ is reduced from 9.5% to 7%. However, practically speaking, irradiation dosages of greater than about 7 Mrads tend to be commercially unattractive. As such, there is considerable desirability to maintain irradiation dosages to at most about 7 Mrads, if not much lower when radiation sensitive substrates are being utilized.

Secondly, the role of the molecular weight of the polymers on election beam curing is very evident. In particular, samples utilizing Polymer 2 (polyisoprene Mw of about 1.1 million) will cure to about 73% polymer gel content at 3.2 Mrads when the $U_T$ is about 6.0%, while samples utilizing Polymers 3 and 4 (having polybutadiene weight average molecular weights of only 0.14 and 0.06 million, respectively) do not form any gel at the same dose; this is despite the fact that polybutadiene has a greater tendency to cure than polyisoprene. Although the polybutadiene molecular weight of Polymer 3 is too low to achieve about a 70% polymer gel content at a $U_T$ of about 6.0% with less than about 7 Mrads (seen in FIG. 6 where about 8.6 Mrads are required), it is still evident that Polymer 3 is considerably better than linear Polymer 4 that has a even smaller polybutadiene molecular weight. Considering how much better Polymer 3 is over Polymer 4, it is easy to extrapolate that a branched polystyrene-polybutadiene polymer having a polydiene molecular weight of about 0.3 million will readily crosslink at 7 Mrads when formulated to a $U_T$ of at most 6%.

Based on the foregoing, it is expected that linear polymers having such a minimum molecular weight poly (conjugated diene) portion or greater would adequately cure at lower dosages. However, a disadvantage of such an increase in the molecular weight of a linear polymer is that the viscosity of compositions incorporating such a polymer, either in the melt or solution, would be undesirably excessive.

TABLE 4

| Formulation (phb)[a] | | | Sample | | | | | | | | | | | |
|---|---|---|---|---|---|---|---|---|---|---|---|---|---|---|
| | | | D | E | F | G | H | J | K | L | M | N | P | Q |
| Polymer | Structure | PD, Mw (Million)[c] | | | | | | | | | | | | |
| 2 | Star | 1.1 | 50.00 | 50.00 | 50.00 | 50.00 | | | | | | | | |
| 3 | Radial | 0.14 | | | | | 50.00 | 50.00 | 50.00 | 50.00 | | | | |
| 4 | Linear | 0.06 | | | | | | | | | 50.00 | 50.00 | 50.00 | 50.00 |
| Oligomer: | | | | | | | | | | | | | | |
| Escorez ® 5380 | | | 50.00 | | | | 50.00 | | | | 50.00 | | | |
| Regalrez ® 1018 | | | | 50.00 | | | | 50.00 | | | | 50.00 | | |
| Escorez ® 1310LC | | | | | 50.00 | | | | 50.00 | | | | 50.00 | |
| Floral ® 85 | | | | | | 50.00 | | | | 50.00 | | | | 50.00 |
| Total | | | 100.00 | 100.00 | 100.00 | 100.00 | 100.00 | 100.00 | 100.00 | 100.00 | 100.00 | 100.00 | 100.00 | 100.00 |
| Antioxidant: | | | | | | | | | | | | | | |
| Ionol ® | | | 0.15 | 0.15 | 0.15 | 0.15 | 0.15 | 0.15 | 0.15 | 0.15 | 0.15 | 0.15 | 0.15 | 0.15 |
| Total Oligomer Unsaturation Index, $U_T$ (%) | | | 0.4 | 3 | 7 | 9.5 | 0.4 | 3 | 7 | 9.5 | 0.4 | 3 | 7 | 9.5 |
| Polymer Gel Content (%) | | | | | | | | | | | | | | |
| Irradiation Dosage (Mrad)[b] | | | | | | | | | | | | | | |
| 0 | | | 3 | 0 | 4 | 1 | 2 | 2 | 2 | 2 | 1 | 2 | 2 | 3 |
| 3.2 | | | 94 | 87 | 68 | 59 | 27 | 6 | 0 | 1 | 3 | 1 | 4 | 2 |

TABLE 4-continued

| Formulation (phb)[a] | Sample | | | | | | | | | | |
|---|---|---|---|---|---|---|---|---|---|---|---|
| | D | E | F | G | H | J | K | L | M | N | P | Q |
| 8.6 | 97 | 93 | 88 | 88 | 91 | 80 | 73 | 19 | 53 | 6 | 6 | 2 |

[a]Parts per hundred blend, wherein the blend constitutes the polymer component plus the oligomer component.
[b]Data relating to Samples D, E, F and G plotted as FIG. 5; data relating to Samples H, J, K and L plotted as FIG. 6; and data relating to Sample M, N, P and Q plotted as FIG. 7.
[c]Poly(conjugated diene) weight average molecular weight of the respective polymer.

EXAMPLE 3

Effect of $U_T$ at Constant EB Dose (with a Commercial Polymer)

In this example, Polymer 5 (commercial Kraton® D1320X Rubber with polyisoprene Mw of about 1.1 million) was mixed with various oligomers, such as tackifying resins and oils, as shown in Table 5 at a fixed polymer to oligomer ratio of 50:50 to obtain samples R through Z. By utilizing different oligomers, the total oligomer unsaturation index ($U_T$) was varied. Test films of each of the samples were subjected to 2.8 Mrad of electron beam (EB) radiation as shown in Table 5, and evaluated with respect to polymer gel content.

It is readily apparent from Table 5 and FIG. 8 that compositions having a $U_T$ of greater than 6.0% do not cure satisfactorily, having less than 60% polymer gel content. Thus, if 2.8 Mrads was the maximum dosage available due to a combination of equipment available and line speed requirements, a conventionally formulated composition (i.e. $U_T$ is greater than 6%) would not cure adequately to give good performance. Likewise, if the composition were being coated onto a substrate that was significantly damaged by more than about 2.8 Mrads of EB energy, the conventionally formulation (i.e. $U_T$ is greater than 6%) based upon commercial Kraton D1320X rubber could not be used successfully. However, at a $U_T$ of at most 6.0%, a 60% or greater polymer gel content could be achieved; below a $U_T$ of about 3.0%, a 75% or greater polymer gel content could be obtained, and below a $U_T$ of about 1.5, a 80% or greater polymer gel content could be achieved.

tions of oligomers as shown in Table 6 at a fixed polymer to oligomer ratio of 45:55 to obtain samples AA through GG. The resins were combined so as to maintain the $T_g$ of the diene resin mixture at $-28°$ C. By using these various combinations of tackifying resins and oils, the $U_T$ was varied from 0.5 to 8.3.

Figure 9:
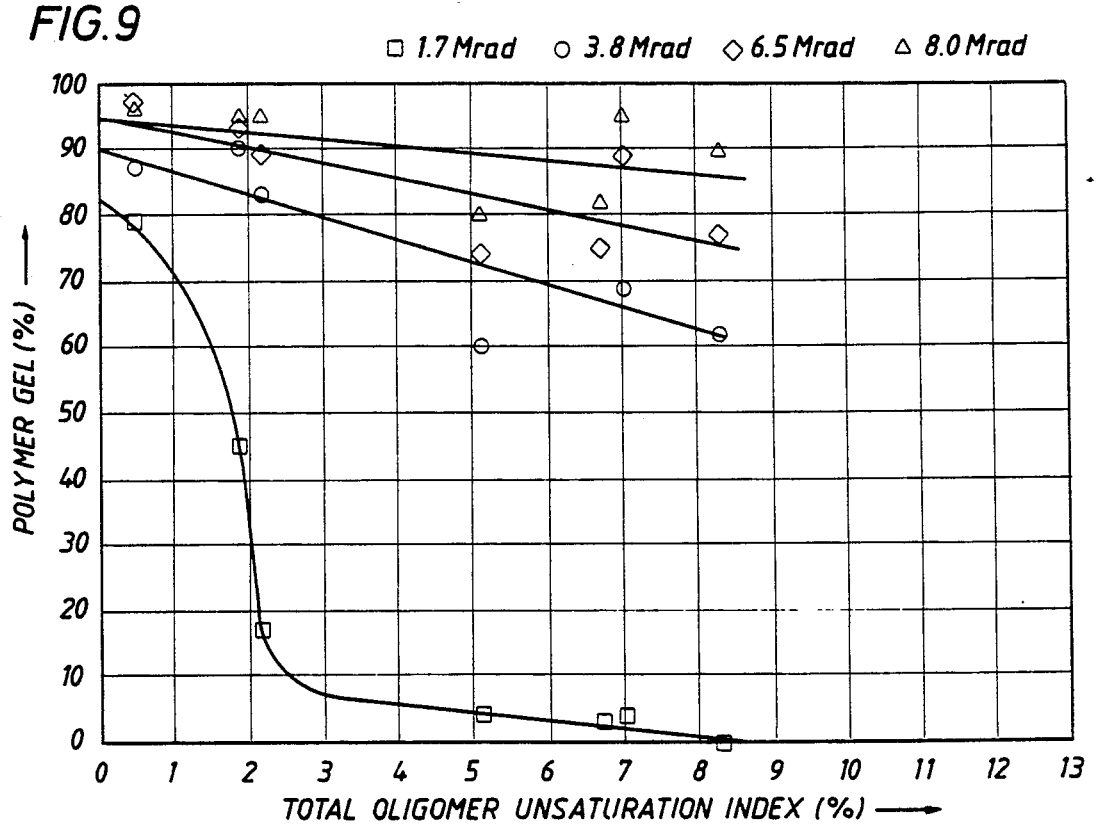
FIG. 9 is an x-y plot of Polymer Gel (%) versus Component Unsaturation Index, $U_T$, (%) at various electron beam irradiation dosages.
Figure 10:
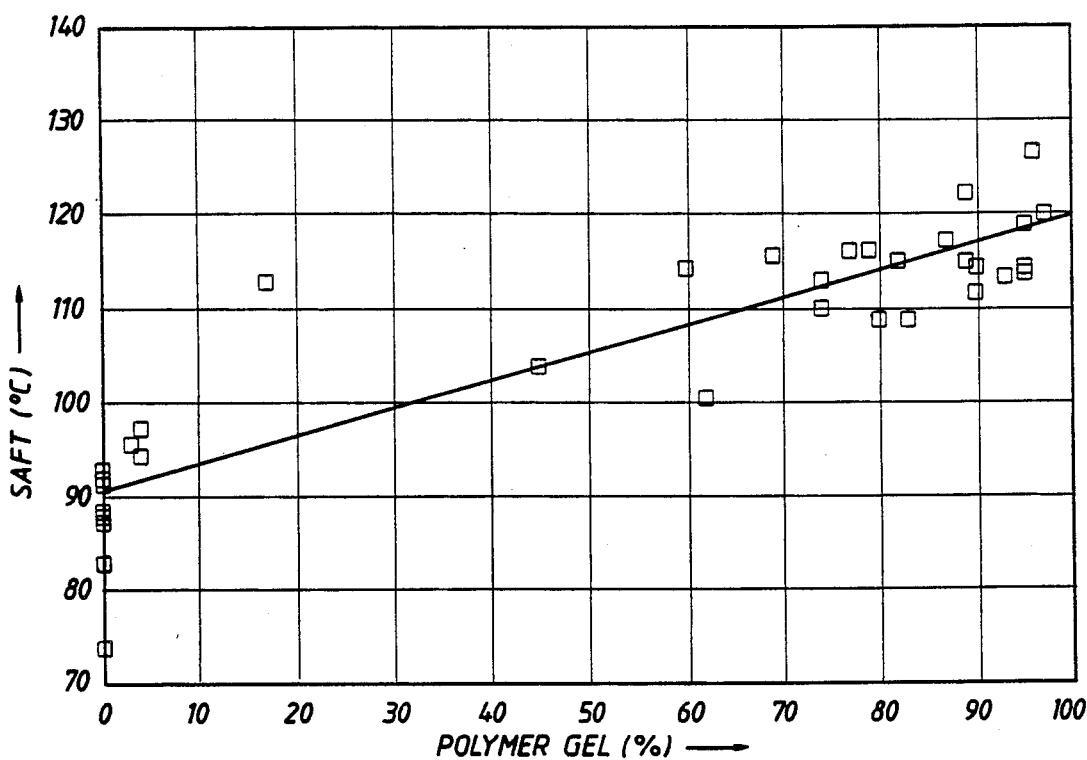
FIG. 10 is an x-y plot of SAFT (°C.) versus Polymer Gel (%).
Figure 11:
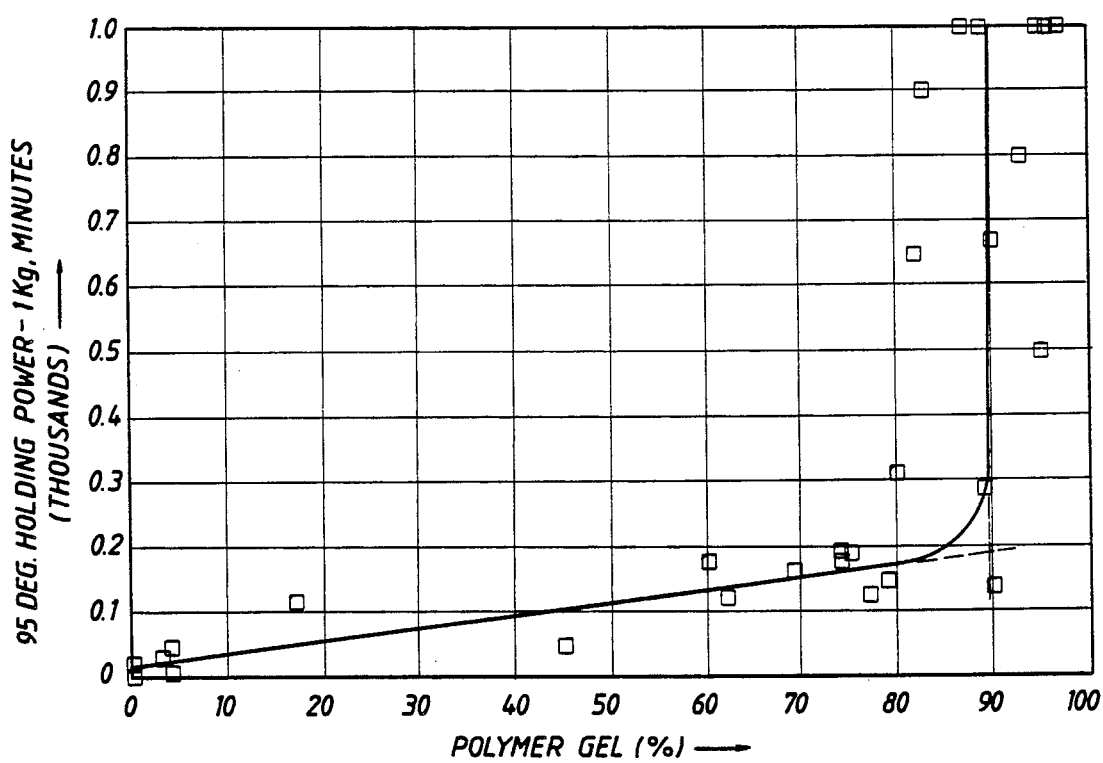
FIG. 11 is an x-y plot of 95° C. Holding Power utilizing a 1 kg. weight (min.) versus Polymer Gel (%).

Behavior similar to that seen in Example 1 is seen in Table 6 and in FIGS. 9-11. Satisfactory cure is obtained at lower irradiation dosages as the total oligomer unsaturation index is decreased. For example, referring to FIG. 9, by using the most preferred range of $U_T$ values, a gel content of about 65-85% can be obtained at a very attractive dose of only 1.7 Mrads. A conventional formulation with a $U_T$ of greater than 6% could not begin to be cured satisfactorily at such a low dose. In fact, as seen in FIG. 9, a conventionally formulated adhesive using Polymer 4 that has a $U_T$ value of about 8% requires a dose of about 6.5 Mrad to give the same degree of cure and properties as sample AA ($U_T$ of about 0.5%) cured at 1.7 Mrad.

FIGS. 10 and 11 graphically represent the relationship of SAFT and 95° C. Holding Power using 1 kilogram weights to Polymer Gel Content, respectively. Steady improvements in SAFT (FIG. 10) are seen as the Polymer Gel Content increases. Although the 95° C. Holding Power test utilizing a 1 kilogram weight is a very severe test, significant improvements are achieved when the Polymer Gel Content reaches 60 to 70%, with very dramatic improvements occurring at Polymer Gel Contents of about 80% and greater.

While the present invention has been described and illustrated by reference to particular embodiments

TABLE 5

| Sample[a] | Oligomer | Total Oligomer Unsaturation Index, $U_T$(%) | Polymer Gel Content (%)[b] at 2.8 Mrad Dose |
|---|---|---|---|
| R | Tufflo® 6056 | 0.4 | 92 |
| S | Escorez® 5380 | 0.4 | 84 |
| T | Shellflex® 371 | 0.5 | 78 |
| U | Regalrez® 1018 | 3.0 | 76 |
| V | Adtac® B10 | 5.5 | 65 |
| W | Escorez® 1310LC | 6.5 | 24 |
| X | Wingtack® 95 | 7.0 | 32 |
| Y | Wingtack® 10 | 8.0 | 11 |
| Z | Floral® 85 | 9.5 | 7 |

[a]Formulation (phb)[c]

| | |
|---|---|
| Polymer 5 (Kraton® D1320X) | 50 |
| Oligomer | 50 |
| Total | 100 |
| Antioxidant: | |
| Ionol® (BHT) | 0.15 |
| Antioxidant 330® | 0.20 |

[b]Data plotted as FIG. 8.
[c]Part per hundred blend, wherein constitutes the polymer component plus the oligomer component.

EXAMPLE 4

Effect of Total Oligomer Unsaturation with Commercial Polymer

In this example, Polymer 5 (commercial Kraton® D1320X rubber) was formulated with various combinathereof, it will be appreciated by those of ordinary skill in the art that the same lends itself to variations not necessarily illustrated herein. For this reason, then, reference should be made solely to the appended claims for purposes of determining the true scope of the present invention.

TABLE 6

| Formulation (phb)[a] | Sample | | | | | | |
|---|---|---|---|---|---|---|---|
| | AA | BB | CC | DD | EE | FF | GG |
| Polymer: | | | | | | | |
| Polymer 5 (Kraton ® D1320X) | 45 | 45 | 45 | 45 | 45 | 45 | 45 |
| Oligomer: | | | | | | | |
| Escorez ® 5380 | 41.5 | 27.4 | 37.4 | | | | |
| Tufflo ® 6056 | 13.5 | | | | | | |
| Regalrez ® 1018 | | 27.6 | | | | | |
| Adtac ® B10 | | | 17.6 | | 21.6 | 23.8 | |
| Escorez ® 1310 | | | | 37.9 | 33.4 | | |
| Shellflex ® 371 | | | | 17.1 | | | |
| Wingtack ® 95 | | | | | | 31.2 | 22.5 |
| Wingtack ® 10 | | | | | | | 32.5 |
| Total | 100.0 | 100.0 | 100.0 | 100.0 | 100.0 | 100.0 | 100.0 |
| Antioxidant | | | | | | | |
| Ionol ® (BHT) | 0.14 | 0.14 | 0.14 | 0.14 | 0.14 | 0.14 | 0.14 |
| Antioxidant 330 ® | 0.18 | 0.18 | 0.18 | 0.18 | 0.18 | 0.18 | 0.18 |
| Total Oligomer Unsaturation Index, $U_T$(%) | 0.5 | 1.9 | 2.2 | 5.1 | 6.7 | 7.0 | 8.3 |
| Polymer Gel Content (%)[b] | | | | | | | |
| Irradiation Dosage (Mrad) | | | | | | | |
| 0 | 0 | 0 | 0 | 0 | 0 | 0 | 0 |
| 1.7 | 79 | 45 | 17 | 4 | 3 | 4 | 0 |
| 3.8 | 87 | 90 | 83 | 60 | 74 | 69 | 62 |
| 6.5 | 97 | 93 | 89 | 74 | 75 | 89 | 77 |
| 8.0 | 96 | 95 | 95 | 80 | 82 | 95 | 90 |
| SAFT - Mylar ® (°C.)[c] | | | | | | | |
| Irradiation Dosage (Mrad) | | | | | | | |
| 0 | 87 | 74 | 83 | 88 | 92 | 92 | 88 |
| 1.7 | 116 | 104 | 113 | 94 | 96 | 97 | 93 |
| 3.8 | 117 | 112 | 109 | 114 | 110 | 116 | 101 |
| 6.5 | 120 | 113 | 115 | 113 | 111 | 122 | 116 |
| 8.0 | 127 | 114 | 119 | 109 | 115 | 114 | 114 |
| 95° C. Holding Power Mylar ® - 1 Kg (min.)[d] | | | | | | | |
| Irradiation Dosage (Mrad) | | | | | | | |
| 0 | 10 | 6 | 9 | 11 | 12 | 23 | 11 |
| 1.7 | 150 | 50 | 120 | 10 | 33 | 50 | 26 |
| 3.8 | >1000 | 670 | 900 | 180 | 180 | 165 | 125 |
| 6.5 | >1000 | 800 | >1000 | 198 | 191 | 290 | 128 |
| 8.0 | >1000 | >1000 | >1000 | 315 | 650 | 500 | 140 |

[a]Parts per hundred blend, wherein the blend constitutes the polymer component plus the oligomer component; Tg (Fox) of B-block/oligomer is −28° C.
[b]Data plotted as FIG. 9. (Polymer Gel Content versus $U_T$).
[c]Data plotted as FIG. 10. (SAFT versus Polymer Gel Content).
[d]Data plotted as FIG. 11. (95° C. Holding Power versus Polymer Gel Content).

What is claimed is:

1. A cured adhesive composition possessing good processability, solvent resistance and high temperature cohesive strength prepared by the high energy ionizing radiation initiated curing of a polymer composition without the use of a crosslinking promoter, said composition comprising:
   (1) a branched block copolymer which comprises
      (a) at least two polymer blocks A, each of said blocks A being at least predominantly a polymerized alkenyl arene block, and
      (b) at least one polymer block B, said block B being at least predominantly a polymerized conjugated diene block,
      (c) wherein
         (i) said at least one block B is between said at least two blocks A,
         (ii) each of said blocks A having a weight average molecular weight of about 3,000 to about 125,000,
         (iii) each of said blocks B having a weight average molecular weight of about 15,000 to about 250,000,
         (iv) said blocks A comprise from about 1 to about 55 percent by weight of said branched block copolymer, and
         (v) said blocks B having a total weight average molecular weight of at least about 0.3 million, and
   (2) at least about 50 parts by weight per 100 parts by weight of said branched block copolymer of at least one oligomer compatible with said blocks B, provided that the total amount of oligomers must comprise at least about 50 parts by weight of a tackifying resin, no more than about 250 parts by weight of an oil and no more than about 100 parts by weight of a wax,
   (3) wherein said composition prior to irradiation has a total oligomer unsaturation index of at most about 3.0%, said total oligomer unsaturation index being defined by the following expression:

$$\sum_{i=1}^{i} (w_i)(U_i) = U_T$$

wherein:
"i" represents a particular oligomer in the composition,

"$w_i$" represents the weight fraction of said particular oligomer based on the total weight of components (1) and (2) of said composition, "$U_i$" represents the unsaturation index of said particular oligomer, as an equivalent percentage of unsaturated carbon atoms therein, "t" represents the total number of said oligomers in said composition, and "$U_T$" represents the unsaturation index of said oligomers;

wherein if other materials are added to the composition in an amount which exceeds about 1 phr, the unsaturation indices of such other materials must be accounted for in determining the unsaturation index of the oligomers ($U_T$) by including the multiplication product of the weight fraction ($w_i$) thereof and its corresponding unsaturation index ($U_i$).

2. The composition according to claim 1, wherein said high energy ionizing radiation is electron beam irradiation.

3. The composition according to claim 2, wherein the amount of irradiation employed is between about 1 and about 20 Mrads.

4. The composition according to claim 3, wherein the amount of irradiation employed is between about 1 and about 7 Mrads.

5. The composition according to claim 4, wherein the amount of irradiation employed is between about 1 and about 3 Mrads.

6. The composition according to claim 4, wherein said total oligomer unsaturation index, $U_T$, is at most about 1.5%.

7. The composition according to claim 1, wherein said branched block copolymer is a radial block copolymer having at least three (3) arms.

8. The composition according to claim 1, wherein said branched block copolymer is a star block copolymer having at least six (6) arms.

9. The composition according to claim 1, wherein said branched block copolymer is represented by the general structural formula

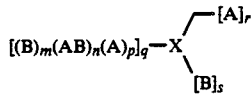

wherein
"A" represents a polymer block A,
"B" represents a polymer block B,
"X" represents a residual group of a polyfunctional coupling agent having two or more functional groups,
"m" is an integer equal to 0 or 1,
"n" is an integer equal to 1 to 10,
"p" is an integer equal to 0 to 1,
"q" is an integer equal to 1 to 40,
"r" is an integer equal to 0 to 20,
"s" is an integer equal to 0 to 39, and $3 \leq q+r+s \leq 40$.

10. The composition according to claim 9, wherein said branched block copolymer is symmetric.

11. The composition according to claim 9, wherein said branched block copolymer is asymmetric.

12. The composition according to claim 11, wherein said block A has an alkenyl arene content of from about 80 to 100 percent by weight based on said block A.

13. The composition according to claim 12, wherein said block A has an alkenyl arene content of 100 percent by weight based on said block A.

14. The composition according to claim 1, wherein said block B has an alkenyl arene content of from 0 to about 20 percent by weight based on said block B.

15. The composition according to claim 14, wherein said block B has an alkenyl arene content of 0 percent by weight based on said block B.

16. The composition according to claim 1, wherein said branched block copolymer has an alkenyl arene content of from about 3 to about 35 percent by weight based on said branched block copolymer.

17. The composition according to claim 16, wherein said branched block copolymer has an alkenyl arene content of about 5 to about 15 percent by weight based on said branched block copolymer.

18. The composition according to claim 1, wherein said blocks B have a total weight average molecular weight of about 0.4 million to about 2.5 million.

19. The composition according to claim 18, wherein said blocks B have a total weight average molecular weight of about 0.8 million to about 1.8 million.

20. The composition according to claim 1, wherein the tackifying resin is present in an amount from about 50 to about 250 parts by weight per 100 parts by weight of said branched block copolymer.

21. The composition according to claim 1 wherein no more than about 60 parts by weight of oil per 100 parts by weight of said branched block copolymer is present in the composition.

22. The composition according to claim 1 wherein no more than about 15 parts by weight of wax per 100 parts by weight of said branched block copolymer is present in the composition.

* * * * *